US012049277B2

(12) United States Patent
Hsu et al.

(10) Patent No.: US 12,049,277 B2
(45) Date of Patent: Jul. 30, 2024

(54) PASSENGER CABIN FOR CARGO BICYCLE

(71) Applicant: Mobility Holdings, Ltd., Hong Kong (HK)

(72) Inventors: Chao Liang Hsu, Hong Kong (HK); Joshua Hon, Hong Kong (HK); Joakim Uimonen, Hong Kong (HK); Wan ru Lin, Hong Kong (HK); Matthew Lawrence Davis, Hong Kong (HK)

(73) Assignee: Mobility Holdings, Ltd., Hong Kong (HK)

( * ) Notice: Subject to any disclaimer, the term of this patent is extended or adjusted under 35 U.S.C. 154(b) by 270 days.

(21) Appl. No.: 17/504,571

(22) Filed: Oct. 19, 2021

(65) Prior Publication Data
US 2022/0119065 A1 Apr. 21, 2022

(30) Foreign Application Priority Data
Oct. 19, 2020 (EP) .................................... 20202530

(51) Int. Cl.
*B62J 1/16* (2006.01)
*B62J 17/08* (2020.01)
*B62J 23/00* (2006.01)

(52) U.S. Cl.
CPC ................. *B62J 17/08* (2013.01); *B62J 1/16* (2013.01); *B62J 23/00* (2013.01)

(58) Field of Classification Search
CPC ........... B62J 17/08; B62J 23/00; B72J 17/083
See application file for complete search history.

(56) References Cited

U.S. PATENT DOCUMENTS 4,166,650 A * 9/1979 Saunders, IV ........... B62J 17/04
296/78.1
4,346,725 A * 8/1982 Shaw ....................... B62J 17/08
296/210
(Continued)

FOREIGN PATENT DOCUMENTS

JP 3196748 U 4/2015
JP 6153186 B1 6/2017

OTHER PUBLICATIONS

Zach Overholt, Yuba adds 30" wide cable actuated dual kickstand, Pop Top cover & $999 cargo bike, bikerumor.com, Posted on Jan. 17, 2020, URL: https://bikerumor.com/2020/01/17/yuba-adds-30-wide-cable-actuated-dual-kickstand-pop-top-cover-999-cargo-bike/.

*Primary Examiner* — Jason D Shanske
*Assistant Examiner* — James J Triggs

(57) ABSTRACT

A cargo bicycle having at least a frame, rear wheel, and rear carrier rack, comprising a rear safety cage, pair of footboards and passenger cabin having a canopy and box is provided. The rear safety cage is mounted to the frame. The passenger cabin is mounted to the rear safety cage, rear carrier rack and pair of footboards and forms an interior passenger space for accommodating passengers and protecting passengers from natural or human-made environmental elements. The canopy forms an upper interior space. The box forms a lower interior space and a pair of lower interior side spaces extending outwardly from the lower interior space, straddling the rear wheel. Each of the pair of lower interior side spaces is a self-contained vessel, further protecting lower extremities of passengers from components of the cargo bicycle and debris during operation of the cargo bicycle.

16 Claims, 16 Drawing Sheets

(56) References Cited

U.S. PATENT DOCUMENTS

| | | | | |
|---|---|---|---|---|
| 4,440,436 A * | 4/1984 | Giddens | ................ | B60J 7/1278 |
| | | | | 135/141 |
| 4,560,196 A * | 12/1985 | Carter, Sr. | ................ | B62J 17/08 |
| | | | | 296/102 |
| 5,904,392 A * | 5/1999 | Mainwal | ................ | B62J 17/08 |
| | | | | 296/180.1 |
| 6,059,351 A * | 5/2000 | Ehnes | ................ | B62D 33/0621 |
| | | | | 296/105 |
| 6,227,557 B1 * | 5/2001 | Perret | ................ | B62J 17/08 |
| | | | | 296/213 |
| 7,690,390 B2 * | 4/2010 | Hopkins | ................ | B62J 17/08 |
| | | | | 135/88.03 |
| 8,322,749 B2 * | 12/2012 | Srabstein | ................ | B62J 27/30 |
| | | | | 280/756 |
| 8,360,084 B1 * | 1/2013 | Robinson | ................ | E04H 6/005 |
| | | | | 135/133 |
| D723,451 S * | 3/2015 | Depew, Jr. | ................ | D12/402 |
| 10,040,501 B2 * | 8/2018 | Haines | ................ | B62J 17/08 |
| 11,198,481 B2 * | 12/2021 | Rayos, Jr. | ................ | A45B 23/00 |

* cited by examiner

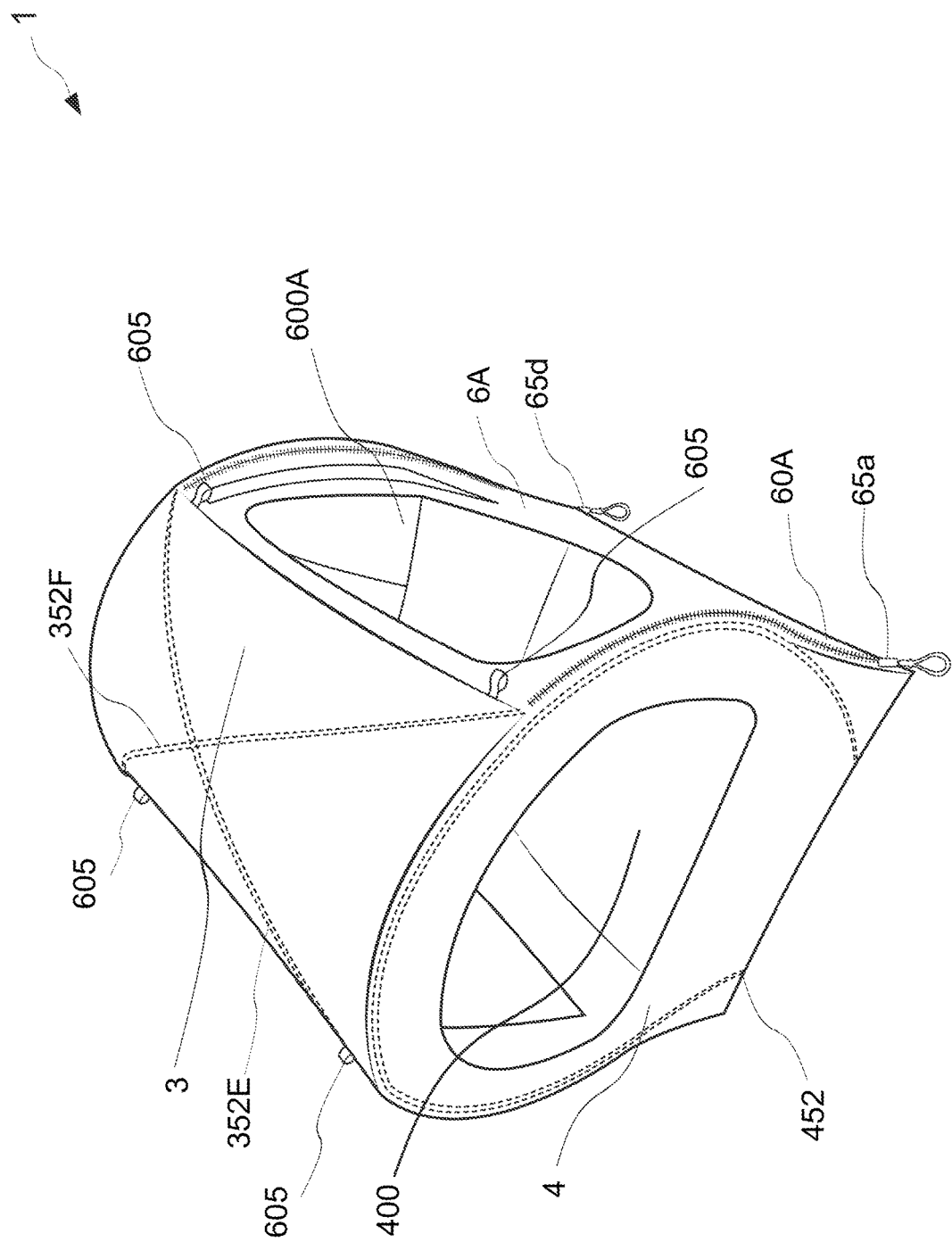

PASSENGER CABIN FOR CARGO BICYCLE

RELATED APPLICATIONS

The application claims the benefit of priority to European patent application no. EP20202530, filed on Oct. 19, 2020, of which is incorporated herein by reference in its entirety.

TECHNICAL FIELD

Example embodiments relate generally to the field of transportation and, more particularly, to a passenger cabin for cargo bicycles, forming an interior passenger space for accommodating passengers and protecting passengers from natural or human-made environmental elements.

BACKGROUND

Cargo bicycles are sturdy bikes which are designed to carry heavier loads and/or two or more passengers. Often, cargo bicycles have a longer wheelbase than standard bicycles, with a space for carrying the heavier loads either in the front or back. Generally, cargo bicycles carrying heavier loads in the back include a rear carrier rack and can be called longtail bikes. Accessories can be integrated with or attached to longtail bikes for customizing specific carrying needs, including passenger bike seats, child bike seats, footboards, cages, boxes, and canopies. Preferences for the accessories generally include being light in weight, being storable and/or transportable in a smaller size, being easy to assembly, and being weatherproof.

Known canopies are semi-closed or closed coverings for accommodating bicyclists, cargo, pets, and/or passengers. Semi-closed canopy coverings can increase a power needed for operation of cargo bicycles, by increasing an air resistance of the cargo bicycles through design, such as exposing at least a partial rear covering and/or lack of stability and/or sturdiness resulting in wobbling, such as a lack of taut spring forces, a lack of reinforced support, and a lack of crosswise tension by use of separate mounted clamps and/or bracket attachment means. In addition, semi-closed canopy coverings can be inconvenient for users as complete protection from rain, wind, snow, or the cold is not provided, and, convenient modifiable openings are unavailable.

Closed coverings can increase a power needed for operation of cargo bicycles, by increasing an air resistance of the cargo bicycles through design, such as L-shaped angles, increasing weight, such as use of hard materials and/or use of over four separate poles, and/or lack of stability and/or sturdiness resulting in wobbling, such as a lack of taut spring forces, a lack of reinforced support, and a lack of crosswise tension by use of separate mounted clamps and/or bracket attachment means.

Semi-closed and closed coverings do not provide complete protection from components of the cargo bicycle and debris during operation of the cargo bicycle.

SUMMARY

A passenger cabin for a cargo bicycle is provided, which offers a convenient, protective and modifiable viewing cabin and a protective seating cabin for users, while being lightweight, stable and sturdy when parked and during moving operation of the cargo bicycle.

In an embodiment, a cargo bicycle has a frame, a front fork, a front wheel mounted to the front fork, a rear wheel mounted to the frame, a rear carrier rack connected to the frame near to the rear wheel, and a steering assembly having a handlebar assembled to the front fork and journaled to the frame, comprising a rear safety cage, pair of footboards, and a passenger cabin is provided. The rear safety cage is mounted to the frame, and at least partially surrounds the rear carrier rack. The rear safety cage comprises cage bar elements and forms a seating space. A pair of footboards is mounted to the frame on opposite sides of the rear wheel and forms foot platforms. A passenger cabin is mounted to the rear safety cage, rear carrier rack and pair of footboards and forms an interior passenger space for accommodating passengers and protecting passengers from natural or human-made environmental elements. The passenger cabin comprises a canopy and a box. The canopy comprises canopy wall elements and forms a sturdy, soft-shelled viewing cabin having an upper interior space. The canopy is at least partially reinforced by the rear safety cage. The box comprises box wall elements and forms a soft-shelled seating cabin having a lower interior space and a pair of lower interior side spaces extending outwardly from the lower interior space. The pair of lower interior side spaces straddle the rear wheel. The lower interior space is reinforced by the rear safety cage and rear carrier rack and each of the pair of lower interior side spaces is reinforced by each of the pair of footboards, respectively. Each of the pair of lower interior side spaces is a self-contained vessel, further protecting lower extremities of passengers from components of the cargo bicycle and debris during operation of the cargo bicycle.

In some embodiments, the cage bar elements comprise a pair of side bars, a pair of front supporting bars, a pair of rear supporting bars, a front bar, and a rear bar. The pair of side bars is spaced apart and parallel. Each of the pair of front supporting bars is connected to front ends of each of the pair of side bars, respectively. Each of the pair of rear supporting bars is connected to rear ends of each of the pair of side bars, respectively, and spaced apart from the pair of front supporting bars. The front bar is connected to each of the pair of front supporting bars, and the rear bar is connected to each of the pair of rear supporting bars. The front bar has a first front protruding end and a second front protruding end opposite the first front protruding end and the rear bar has a first rear protruding end and a second rear protruding end opposite the first protruding end. The first front protruding end is on a same side as the first rear protruding end. The canopy is at least partially and the box is reinforced by the rear safety cage by flush tight attachment to the first and second front protruding ends and first and second rear protruding ends, respectively.

In certain embodiments, the attachment of the canopy to the first and second front protruding ends and first and second rear protruding ends is by expedient slip-on attachment. In certain embodiments, the attachment of the box to the first and second front protruding ends and first and second rear protruding ends is by expedient slip-on attachment. The canopy and box is tightly slip-on mounted to the cargo bicycle conveniently and simply, providing crosswise stretching tension, while also allowing for convenient and simple removal.

In the embodiment, the first and second front protruding ends and first and second rear protruding ends protect hands of passengers when holding on to the pair of side bars and bodies of passengers when in a seated position on the cargo bicycle due to sideward falling down of the cargo bicycle or side swipes from vehicles, walls or hard structures.

In some embodiments the canopy wall elements comprise a floor opening, a ceiling element, a front wall, a rear wall, a first side wall and a second side wall. The ceiling element is opposite the floor opening. The front wall extends from a front ceiling edge of the ceiling element and the rear wall extends from a rear ceiling edge of the ceiling element opposite the front wall. The first side wall and second side wall, each extend from opposite side ceiling edges of the ceiling element between the front and rear ceiling edges and each is connected to a first front wall edge of the front wall and a first rear wall edge of the rear wall, and a second front wall edge of the front wall and a second rear wall edge of the rear wall, respectively. At least one of the first and second side walls comprise a pair of fastening elements positioned along respective front and rear detachable edges of the first and second side walls. The front and rear detachable edges are positioned near to the connection to the front wall and rear wall, respectively. The at least one of the first and second side walls is detachable against the respective front and rear detachable edges via the pair of fastening elements.

In certain embodiments, the canopy further comprises a frame structure, at least partially supporting the upper interior space, comprising a front spring force arched cross member, a rear spring force arched cross member and a pair of diagonal arched ceiling members. The front wall, rear wall and ceiling element each comprise frame structure receiving inlets near to the front ceiling edge and connection to the first front and rear wall edges, near to the rear ceiling edge and connection to the second front and rear wall edges, and diagonally across the ceiling element, respectively. The front spring force arched cross member, rear spring force arched cross member and pair of diagonal arched ceiling members are assembled to the front wall, rear wall and ceiling element via the frame structure receiving inlets, respectively, providing tautness to the front wall, rear wall, and ceiling element.

In certain embodiments, the canopy wall elements comprise at least one window integrated into the front wall, the rear wall, the first side wall or the second side wall or any combination of the foregoing. In certain embodiments the at least one window is made of a transparent material, a translucent material or a UV resistant material or any combination of the foregoing.

In certain embodiments, a modifiable volume of the upper interior space is provided. The rear wall comprises an upper rear element and a lower rear element, wherein the upper rear element overlaps and is expandable against the lower rear element. The upper rear element has an expansive element integrated centrally between non-expansive elements into a lower side thereof and a pair of adjustable fasteners, each on opposite sides of the expansive element near to a lower edge of the upper rear element. When the pair of adjustable fasteners are released, the expansive element expands a volume of the upper interior space.

In some embodiments, the box wall elements comprise a first box side element, a second box side element opposite the first box side element, a first box inner side shaping element, a second box inner side shaping element, a front box element, and a rear box element opposite the front box element. The first box inner side shaping element extends from a first perimeter edge of the first box side element and the second box inner side shaping element extends from a second perimeter edge of the second box side element. The front box element extends from front side edges of the first and second box side elements and first and second box inner side shaping elements, respectively. The rear box element extends from rear side edges of the first and second box side elements and first and second box inner side shaping elements, respectively. The first box side element, second box side element, front box element, and rear box element at least partially define the lower interior space and the first box side element, second box side element, front box element, rear box element, first box inner side shaping element, and second box inner side shaping element at least partially define the pair of lower interior side spaces, respectively. The box protects passengers from outside weather elements.

In certain embodiments, the first box inner side shaping element has at least a first inner seat shaping element flap extending therefrom, the second box inner side shaping element has at least a second inner seat shaping element flap extending therefrom, the front box element has a front inner seat shaping element extending centrally therefrom and the rear box element has a rear inner seat shaping element extending centrally therefrom. The front inner seat shaping element is fastenable to the rear inner seat shaping element and the first box inner side shaping element is fastenable to the second box inner side shaping element for quick, sturdy and efficient assembly.

In certain embodiments, the box further comprises at least a pair of footboard attachment fasteners disposed near to the first and second perimeter edges, respectively. Attachment of the box to the pair of footboards is via the at least a pair of footboard attachment fasteners for quick, sturdy and efficient assembly.

In some embodiments, at least one of the canopy or box or any combination of the foregoing, is made of a waterproof, a showerproof, a moisture wicking, a quick drying, a wind resistant, a dirt resistant, a mildew resistant, an oil resistant, a salt resistant, a chemical resistant or a UV ray resistant material or coating or any combination of waterproof, showerproof, moisture wicking, quick drying, wind resistant, dirt resistant, mildew resistant, oil resistant, salt resistant, chemical resistant and UV ray resistant material or coating.

In some embodiments, the cargo bicycle further comprises at least one of a passenger bike seat, passenger bike seat having back support or child bike seat or any combination of the foregoing, mounted to at least the rear carrier rack, opposite the rear wheel, supporting passengers when in a seated position on the cargo bicycle. In some embodiments, the cargo bicycle is at least one of a pedal, pedal-based electric assist or electric cargo bicycle.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of cargo bicycles and passenger cabins incorporating aspects of the presently disclosed principles are illustrated by way of example, and not by way of limitation.

FIG. 5A depicts a representation of the embodiment of the canopy of FIG. 1A.

DETAILED DESCRIPTION

Figure 1A:
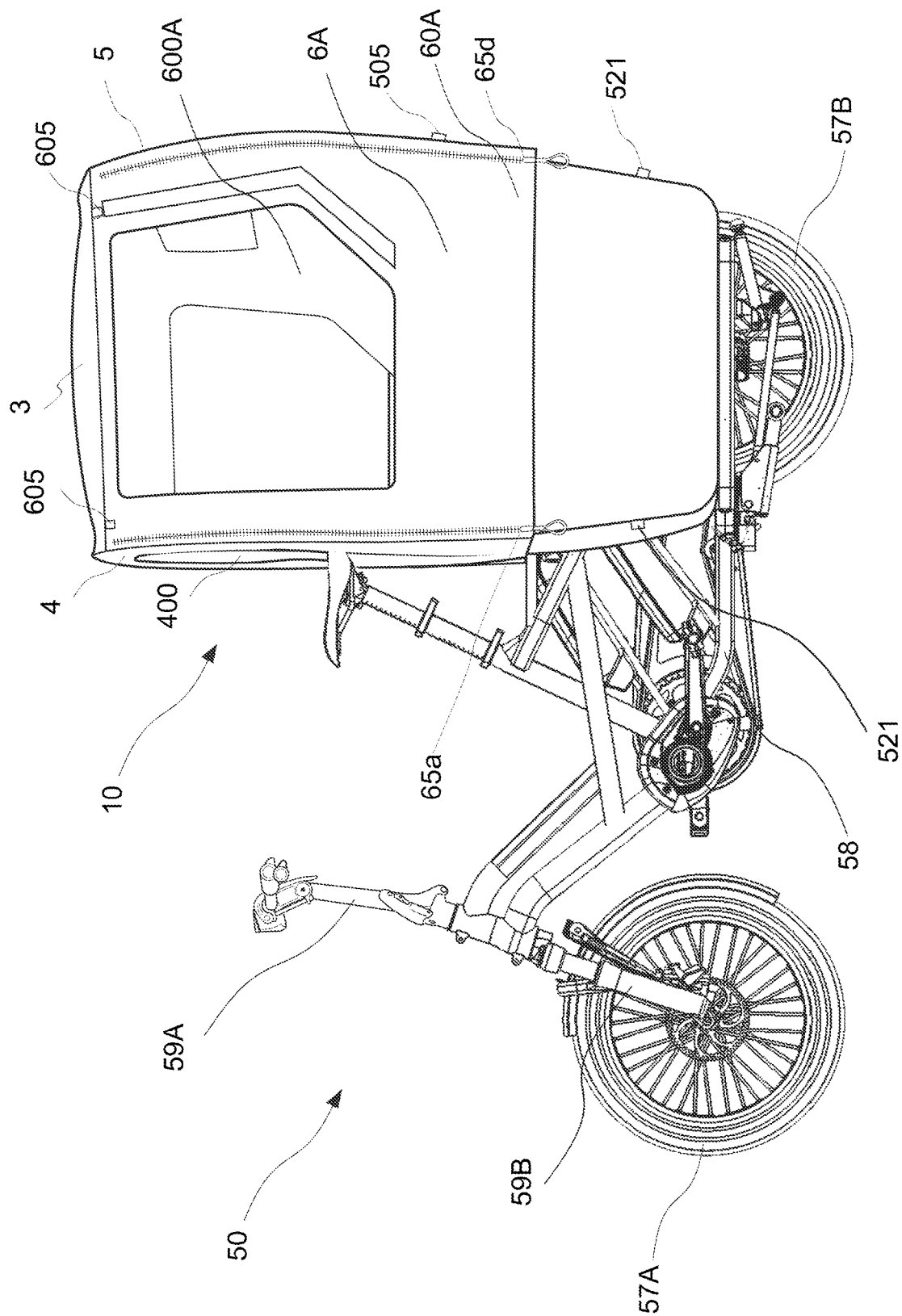
FIG. 1A depicts a representation of an embodiment of a passenger cabin mounted to a cargo bicycle.

The following describes various principles related to the field of transportation by way of reference to specific examples of passenger cabins for cargo bicycles for forming a usable and protective interior, including arrangements and examples of cargo bicycles, rear safety cages, footboards and passenger cabins embodying innovative concepts. More particularly, but not exclusively, such innovative principles are described in relation to selected examples of cargo bicycles, canopies and boxes and well-known functions or constructions are not described in detail for purposes of succinctness and clarity. Nonetheless, one or more of the disclosed principles can be incorporated in various other embodiments of cargo bicycles, canopies and boxes to achieve any of a variety of desired outcomes, characteristics, and/or performance criteria.

Thus, cargo bicycles, rear safety cages, footboards, canopies and boxes having attributes that are different from those specific examples discussed herein can embody one or more of the innovative principles, and can be used in applications not described herein in detail. Accordingly, embodiments of cargo bicycles, rear safety cages, footboards, canopies and boxes not described herein in detail also fall within the scope of this disclosure, as will be appreciated by those of ordinary skill in the relevant art following a review of this disclosure.

Example embodiments as disclosed herein are directed to convenient, protective, modifiable, lightweight, stable and sturdy soft-shelled passenger cabins for cargo bicycles. In an embodiment, a cargo bicycle (50) comprising a rear safety cage (52), a pair of footboards (54A, 54B) and a passenger cabin (10) having a canopy (1), forming an upper interior space (7) and a box (51), forming a lower interior space (517) and a pair of lower interior side spaces (5127A, 5127B) for accommodating passengers (70) is provided. The rear safety cage (52) is mounted to a frame (58) of the cargo bicycle (50), forming an interior seating space (527). The pair of footboards (54A, 54B) is mounted to the frame (58) on opposite sides of a rear wheel (57B) of cargo bicycle (50). The passenger cabin (10) is mounted to the rear safety cage (52), rear carrier rack (53) and pair of footboards (54A, 54B) and forms an interior passenger space for accommodating and protecting passengers (70) from natural or human-made environmental elements. The canopy (1) forms a sturdy, soft-shelled viewing cabin having the upper interior space (7). The box (51) forms a sturdy soft-shelled seating cabin having the lower interior space (517) and pair of lower interior side spaces (5127A, 5127B) extending outwardly from the lower interior space (517). Each of the pair of lower interior side spaces (5127A, 5127B) is a self-contained vessel, further protecting lower extremities of passengers (70) from components of the cargo bicycle (50) and debris during operation of the cargo bicycle.

The term "canopy" in the present context is understood to mean a soft-shelled viewing cabin provided on a rear safety cage (52) of a cargo bicycle (50), which offers a usable interior space (7) for accommodating passengers (70). The term "box" in the present context is understood to mean a sturdy soft-shelled seating cabin provided on a rear safety cage (52), rear carrier rack (53) and pair of footboards (54A, 54B) of a cargo bicycle (50), which offers a usable lower interior space (517) and pair of lower interior side spaces (5127A, 5127B) for accommodating passengers (70). The term "rear carrier rack" in the present context is understood to mean any bicycle rear carrier rack that can be integrated or mounted to a rear of the cargo bicycle (50). The term "rear safety cage" in the present context is understood to mean a structure that can be integrated and/or mounted to a rear of a cargo bicycle having a rear carrier rack (53) and pair of footboards (54A, 54B), which the passenger cabin (10) can be simply and sturdily secured to, offering a usable interior seating space (527). The term "footboards" in the present context is understood to mean any bicycle footboard and/or footboard means that can be integrated or mounted to a rear of the cargo bicycle (1). In particular, bicycle footrests, running boards, and/or footboards can be mounted to the cargo bicycle (1) and/or on a corresponding frame structure of the cargo bicycle (1) for accommodating feet of passengers (70).

Figure 1B:
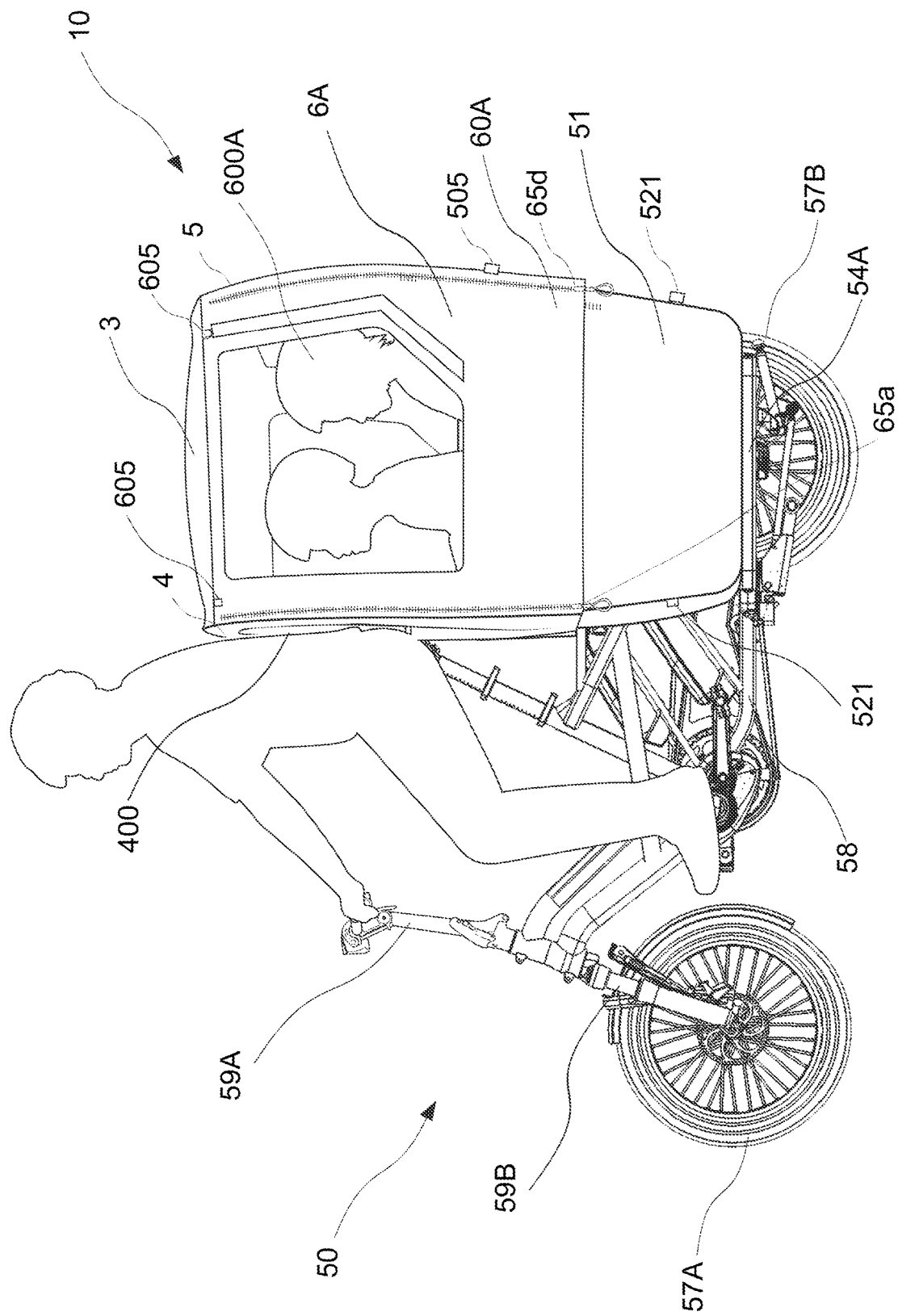
FIG. 1B depicts another representation of the embodiment of the passenger cabin mounted to a cargo bicycle of FIG. 1A, accommodating and protecting passengers.
Figure 2:
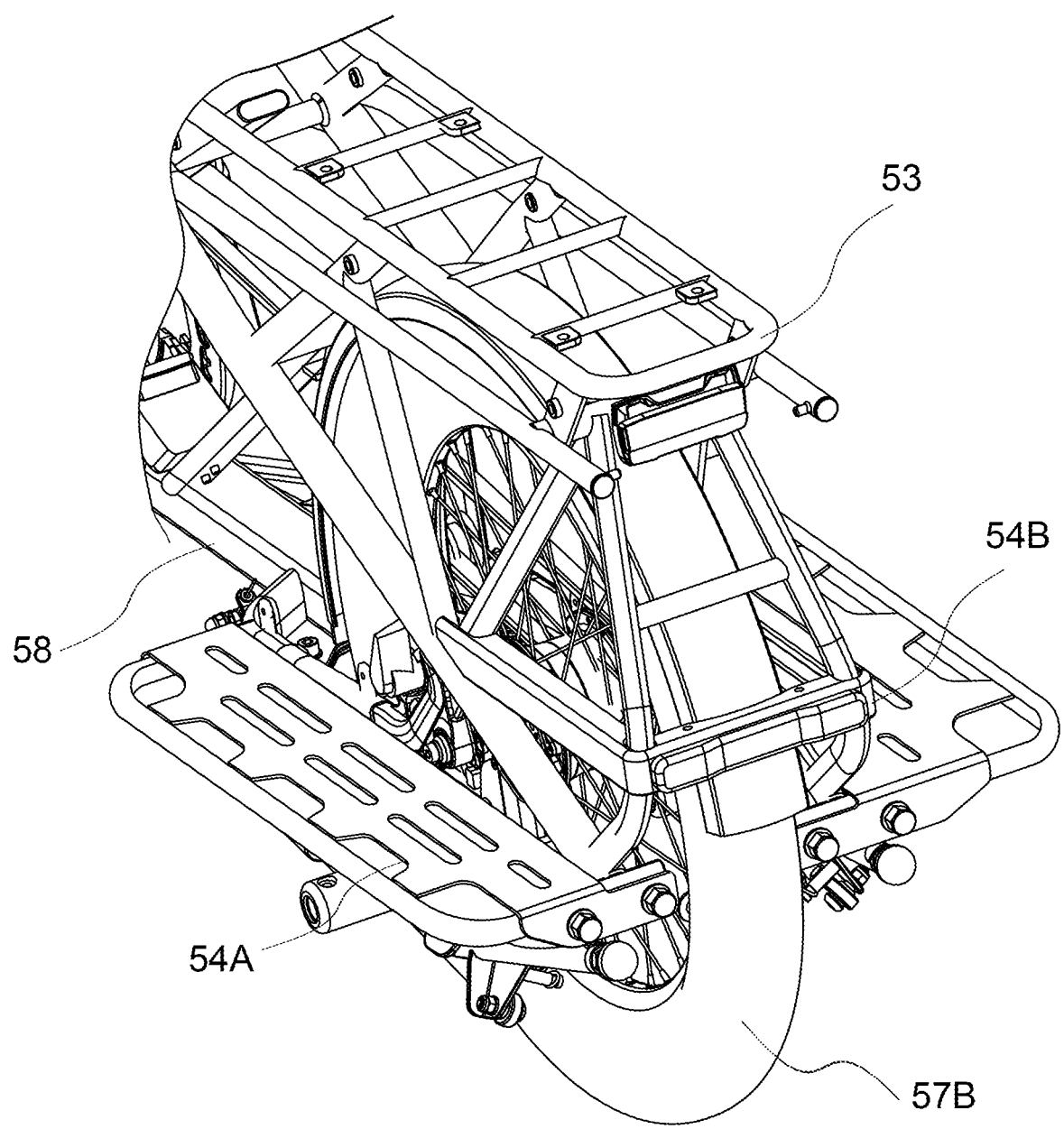
FIG. 2 depicts a representation of an embodiment of a pair of footboards mounted to a frame of a cargo bicycle having a rear carrier rack.

FIG. 1A depicts a representation of an embodiment of a passenger cabin mounted to a cargo bicycle, FIG. 1B depicts another representation of the embodiment of the passenger cabin mounted to a cargo bicycle of FIG. 1A, accommodating and protecting passengers, and FIG. 2 depicts a representation of an embodiment of a pair of footboards mounted to a frame of a cargo bicycle having a rear carrier rack. Referring to FIGS. 1A to 2, in an embodiment, a cargo bicycle (50) having a frame (58), a front fork (59B), a front wheel (57A) mounted to the front fork (59B), a rear wheel (57B) mounted to the frame (58), a rear carrier rack (53) connected to the frame (58) near to the rear wheel (57B), and a steering assembly (59A) having a handlebar assembled to the front fork (59B) and journaled to the frame (58), comprising a rear safety cage (52), pair of footboards (54A, 54B), and a passenger cabin (10) is provided. The rear safety cage (52) is mounted to the frame (58), and at least partially surrounds the rear carrier rack (53). The rear safety cage (52) comprises cage bar elements and forms a seating space (527). A pair of footboards (54A, 54B) is mounted to the frame (58) on opposite sides of the rear wheel (57B) and forms foot platforms. In some embodiments, the footboards (54A, 54B) can be separate footboards mounted to the cargo bicycle (50) and/or be integrated with the cargo bicycle (50).

A passenger cabin (10) is mounted to the rear safety cage (52), rear carrier rack (53) and pair of footboards (54A, 54B) and forms an interior passenger space for accommodating passengers (70) and protecting passengers (70) from natural or human-made environmental elements, for example, rain, wind, snow, cold, etc. or dust or sand from construction etc. The passenger cabin (10) comprises a canopy (1) and a box (51). The canopy (1) comprises canopy wall elements and forms a sturdy, soft-shelled viewing cabin having an upper interior space (7). The canopy (1) is at least partially reinforced by the rear safety cage (52) and is simply and sturdily secured to the rear safety cage (52). The box (51) comprises box wall elements and forms a sturdy soft-shelled seating cabin having a lower interior space (517) and a pair of lower interior side spaces (5127A, 5127B) extending outwardly from the lower interior space (517) and is simply and sturdily secured to the rear safety cage (52), rear carrier rack (53) and pair of footboards (54A, 54B). The pair of lower interior side spaces (5127A, 5127B) straddle the rear wheel (57B). The lower interior space (517) is at least reinforced by the rear safety cage (52) and rear carrier rack (53) and each of the pair of lower interior side spaces (5127A, 5127B) is at least reinforced by each of the pair of footboards (54A, 54B), respectively. Each of the pair of lower interior side spaces (5127A, 5127B) is a self-contained vessel, further protecting lower extremities of passengers (70) from components of the cargo bicycle (50) and debris during operation of the cargo bicycle (50), for example, spinning bike wheel spokes and dirt, gravel, mud, sand etc. kicked up from dirt and/or gravel roads and/or dirty puddles and rivulets during moving operation of the cargo bicycle (50).

Figure 3:
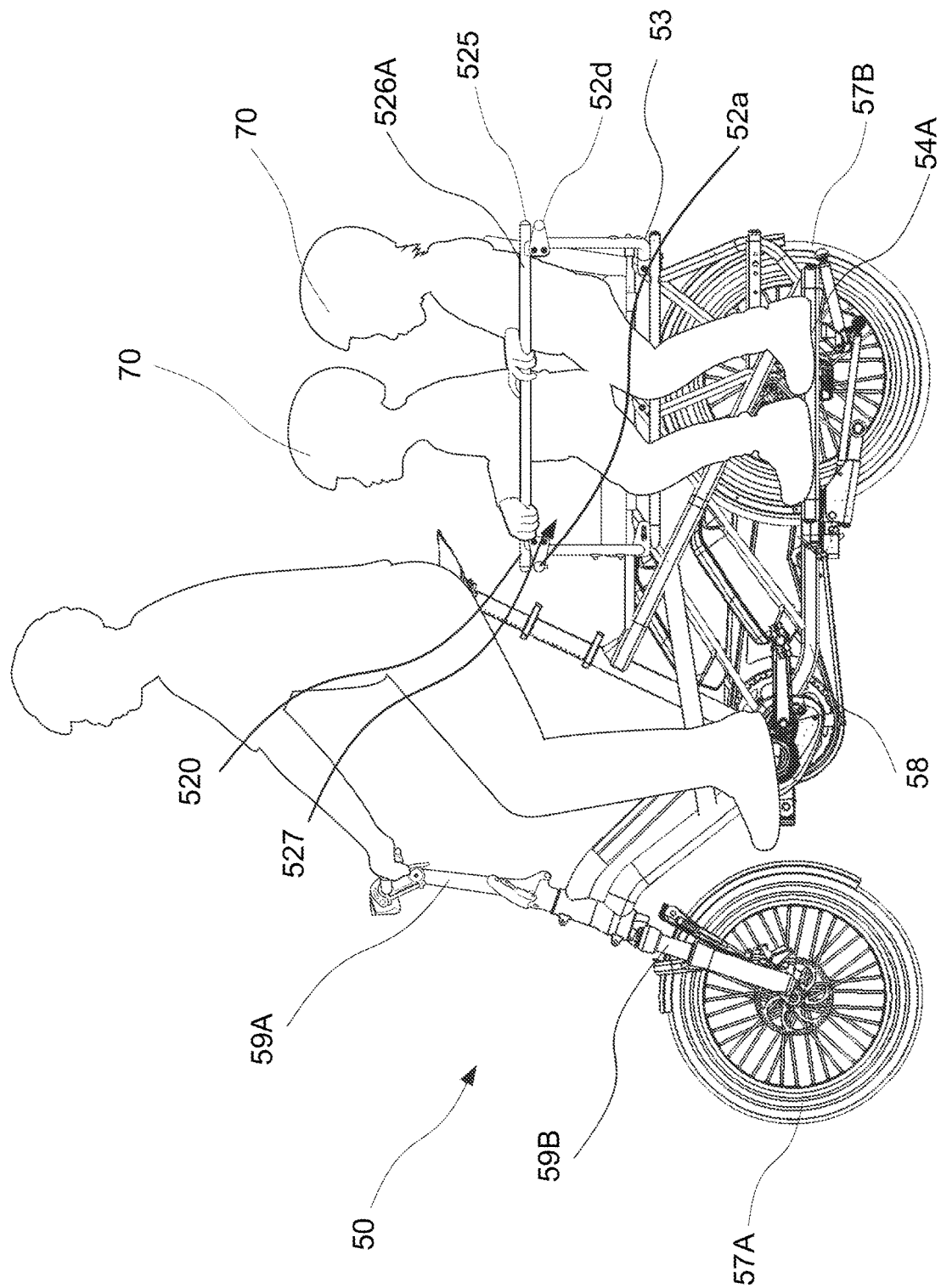
FIG. 3 depicts a representation of an embodiment of a rear safety cage and pair of footboards mounted to a frame of a cargo bicycle, accommodating and protecting passengers.

FIG. 3 depicts a representation of an embodiment of a rear safety cage and pair of footboards mounted to a frame of a cargo bicycle, accommodating and protecting passengers. Referring to FIG. 3, and referring to FIGS. 1A to 2, in some embodiments, the cage bar elements comprise a pair of side bars (526A, 526B), a pair of front supporting bars (524a, 524d), a pair of rear supporting bars (525b, 525c), a front bar (524), and a rear bar (525). The pair of side bars (526A, 526B) is spaced apart and parallel. Each of the pair of front supporting bars (524a, 524d) is connected to front ends of each of the pair of side bars (526A, 526B), respectively. Each of the pair of rear supporting bars (525b, 525c) is connected to rear ends of each of the pair of side bars (526A, 526B), respectively, and spaced apart from the pair of front supporting bars (524a, 524d). The front bar (524) is connected to each of the pair of front supporting bars (524a, 524d), and the rear bar (525) is connected to each of the pair of rear supporting bars (525b, 525c). The front bar (524), pair of side bars (526A, 526B) and rear bar (525) may form a generally quadrilateral shape. The pair of front supporting bars (524a, 524b) is formed generally diagonally inward, whereby the pair of front supporting bars (524a, 524b), front bar (524) and rear carrier rack (53) form a generally trapezoid shape. The pair of rear supporting bars (524a, 524b) is formed generally L-shaped inward, whereby the pair of rear supporting bars (524a, 524b), rear bar (525) and rear carrier rack (53) form a generally quadrilateral shape. The front bar (524) has a first front protruding end (52a) and a second front protruding end (52b) opposite the first front protruding end (52a) and the rear bar (525) has a first rear protruding end (52d) and a second rear protruding end (52c) opposite the first protruding end. The first front protruding end (52a) is on a same side as the first rear protruding end (52d). When the pair of side bars (526A, 526B) are gripped by passengers (70), the first and second front protruding ends (52a, 52b) and first and second rear protruding ends (52d, 52c) of the pair of side bars (526A, 526B), respectively, are configured to protect the hands of passengers (70) and sides of the bodies of passengers (70) when in a seated position on the cargo bicycle (50) from injury due to sideward falling down of the cargo bicycle (50) and/or side swipes from vehicles, walls and/or hard structures etc. when parked and/or during moving operation of a cargo bicycle (50). The length of the rear carrier rack (53) of the cargo bicycle (50) is between 64 cm to 90 cm and the load of the cargo bicycle (50) is up to 200 kg. One passenger, in particular two passengers can occupy the area of the rear carrier rack (53) during operation of the cargo bicycle (50).

Figure 4:
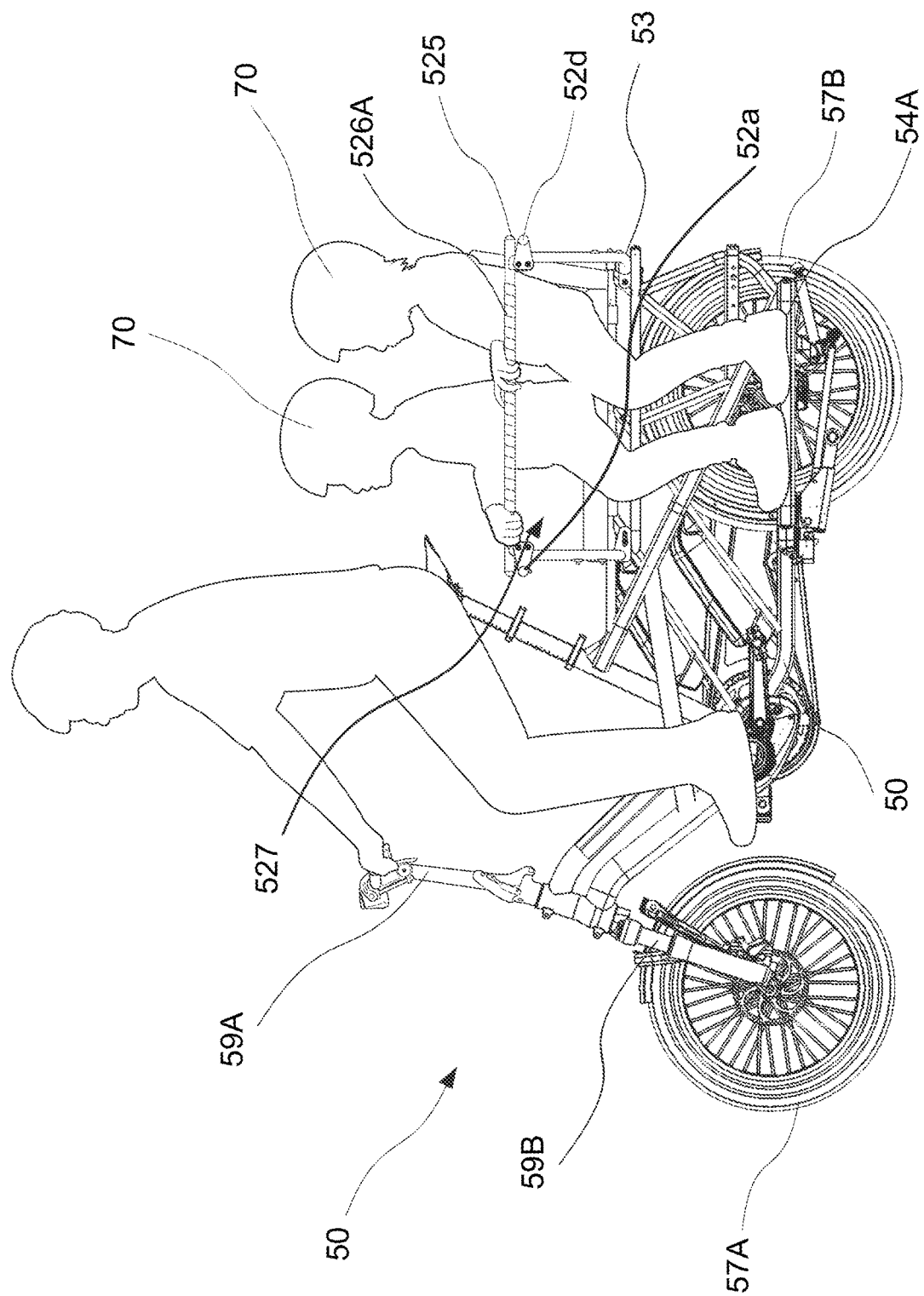
FIG. 4 depicts another representation of an embodiment of a rear safety cage and pair of footboards mounted to a frame of a cargo bicycle, accommodating and protecting passengers.

FIG. 4 depicts another representation of an embodiment of a rear safety cage and pair of footboards mounted to a frame of a cargo bicycle, accommodating and protecting passengers. Referring to FIG. 4, and referring to FIGS. 1A to 3, in certain embodiments, the pair of side bars (526A, 526B) can comprise wrapping tape and/or comprise gripping grooves for better gripping by passengers (70) when holding on to the pair of side bars (526A, 526B).

Figure 5B:
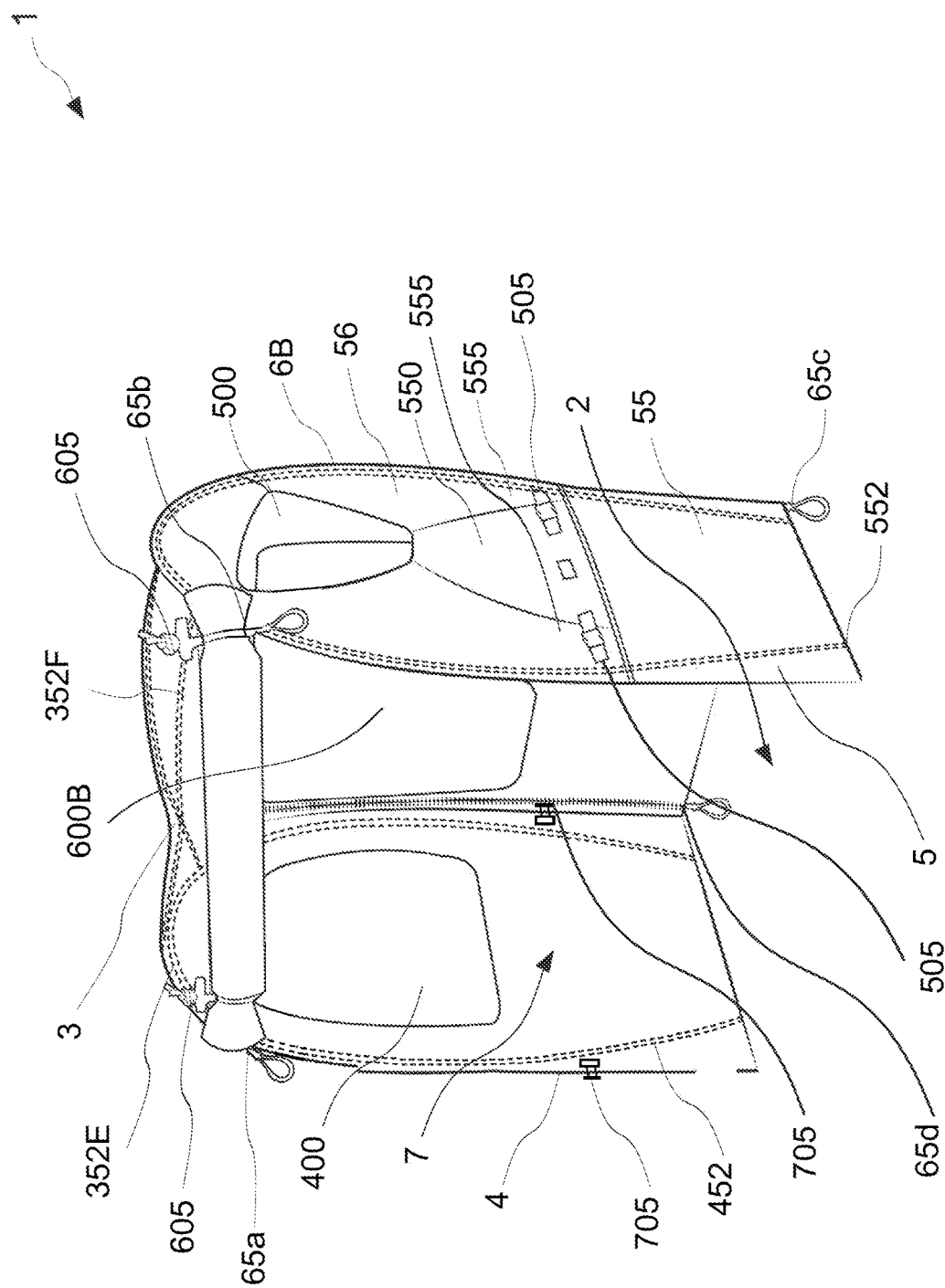
FIG. 5B depicts another representation of the embodiment of the canopy of FIG. 5A, having a first side wall detached.
Figure 6:
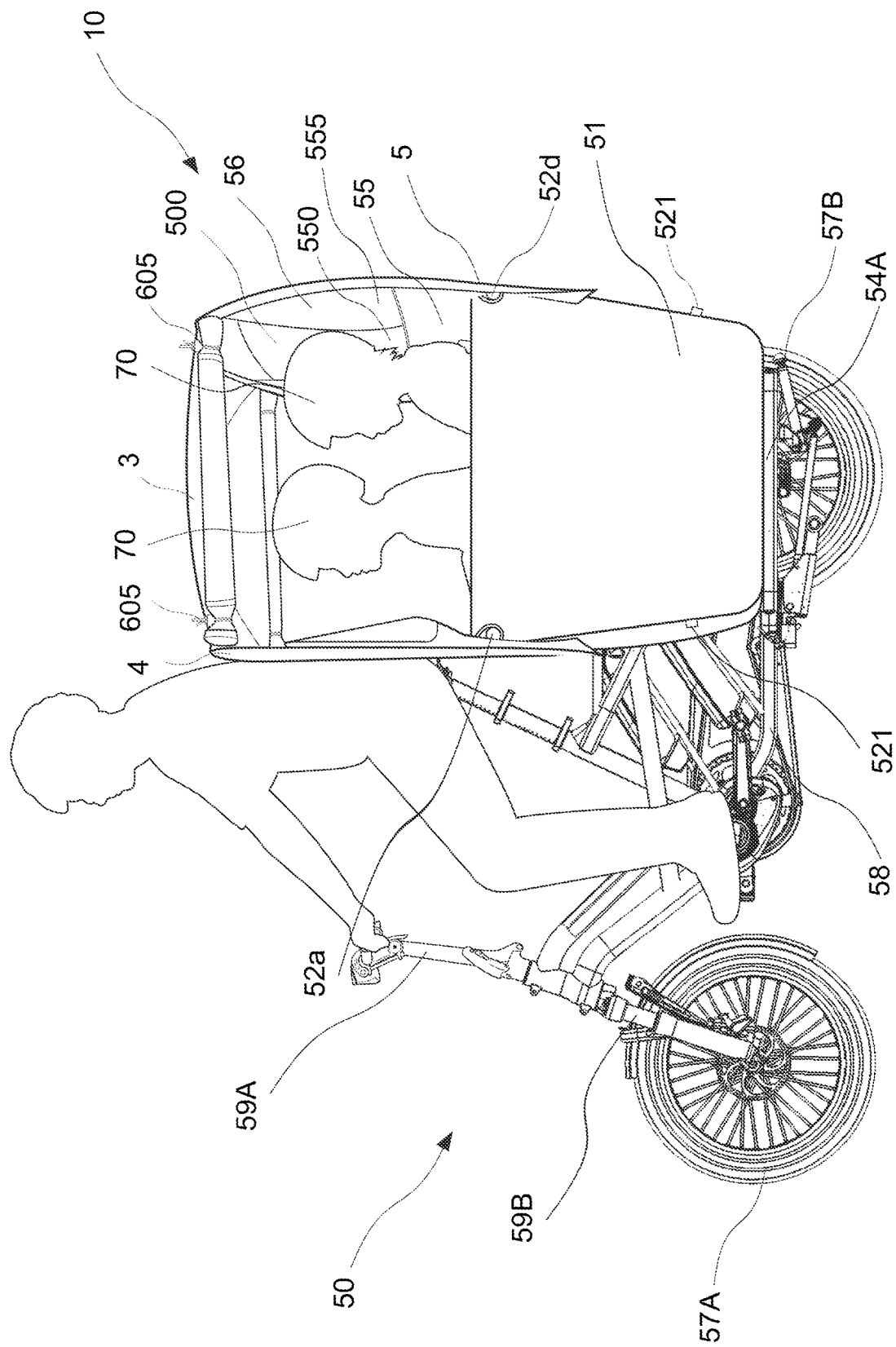
FIG. 6 depicts a representation of an embodiment of a passenger cabin, having first and second side walls detached and accommodating and protecting passengers.

In some embodiments, the canopy wall elements comprise a floor opening (2), a ceiling element (3), a front wall (4), a rear wall (5), a first side wall (6A) and a second side wall (6B). FIGS. 5A and 5B depict representations of an embodiment of a canopy of FIG. 1A and FIG. 6 depicts a representation of an embodiment of a passenger cabin, having first and second side walls detached and accommodating and protecting passengers. Referring to FIGS. 5A to 6, and referring to FIGS. 1A to 4, the canopy (1), forming a sturdy soft-shelled viewing cabin and an upper interior space (7) for accommodating passengers (70), may be in an unfurled state, and optionally, in a furled state, respectively. The front wall (4) and rear wall (5) and first and second side walls (6A, 6B) are generally of the same sizes and shapes and positioned on corresponding opposing sides of the upper interior space (7), respectively, integrative combined, forming a generally cube and/or cuboid shape. The first and second side walls (6A, 6B) are generally quadrilateral shaped and the front wall (4) and rear wall (5) are generally quadrilateral shaped with an arch on one end, in which the arch is positioned on integrative edges with the ceiling element (3), respectively. The ceiling element (3) is generally positioned on a corresponding opposing side of the floor opening (2). The ceiling element (3) forms a generally elliptic paraboloid shape, tapering in height toward the front wall (4) and rear wall (5) of the canopy (1), forming four generally even spaced taut central wedge-like aerodynamic shapes. The front wall (4) extends from a front ceiling edge of the ceiling element (3) and the rear wall (5) extends from a rear ceiling edge of the ceiling element (3) opposite the front wall (4). The first side wall (6A) and second side wall (6B), each extend from opposite side ceiling edges of the ceiling element (3) between the front and rear ceiling edges and each is connected to a first front wall edge of the front wall (4) and a first rear wall edge of the rear wall (5), and a second front wall edge of the front wall (4) and a second rear wall edge of the rear wall (5), respectively. The height of the canopy (1) from the floor opening (2) to the top of a center of the arch of the ceiling element (3) is between 80 cm to 125 cm, inclusive, in particular 83 cm. The length of the canopy (1) from the front wall (4) to the rear wall (5) is between 45 cm to 85 cm, inclusive, in particular 65 cm. The width of the canopy (1) between first and second side walls (6A, 6B) is between 60 cm to 80 cm, inclusive, in particular 60 cm. One passenger, in particular two passengers can occupy the upper interior space (7) during operation of the cargo bicycle (50). The height of the passengers can be between 75 cm to 200 cm, inclusive.

In certain embodiments, the canopy (1) comprises an aerodynamic shape, wherein the ceiling element (3) taper in height toward the front wall (4), rear wall (5) and two side walls (6A, 6B) of the canopy (1) and form approximately central wedge-like aerodynamic shapes. The aerodynamic shapes decrease power needed for operation of the cargo bicycle (1), by decreasing top air resistance from all sides when parked and from the front and flowing to the rear during forward moving operation of the cargo bicycle (50).

Openings of the upper interior space (7) of the canopy (1) can be modified between a furled and unfurled state. At least one of the first and second side walls (6A, 6B) comprise a pair of fastening elements (65a/65d, 65b/65c) positioned along respective front and rear detachable edges of the first and second side walls (6A, 6B). The front and rear detachable edges are positioned near to the connection to the front wall (4) and rear wall (5), respectively. The at least one of the first and second side walls (6A, 6B) is detachable against the respective front and rear detachable edges via the pair of fastening elements (65a/65d, 65b/65c). For example, side elements (60A, 60B) are rolled and/or folded upward from the rear safety cage (52) and box (51) of the cargo bicycle (50) to be detached via the pair of fastening elements (65a/65d, 65b/65c) to the ceiling element (3), and can be locked in the furled state. Optionally, the side elements (60A, 60B) can be detached via the pair of fastening elements (65a/65d, 65b/65c) and rolled and/or folded upward and be locked in the furled state in two, three, four, or five or more spaced intervals, having two, three, four, or five or more corresponding interval spaced furled fastener (605) on the outer side of the pair of fastening elements (65a/65d, 65b/65c). The first and second side elements (60A, 60B) and pair of fastening elements (65a/65d, 65b/65c) are formed by the first and second side walls (6A, 6B). In the furled state, the at least one of the first and second side walls (6A, 6B) has a side opening of the upper interior space (7), and in an unfurled state, the at least one of the first and second side walls (6A, 6B) has no side opening of the upper interior space (7). In certain embodiments, the canopy (1) further comprises a furled fastener (605), in which the at least one side element can be locked in the furled state via the furled fastener (605). A space is provided for the at least one of the first and second side walls (6A, 6B) and detachable pair of fastening elements (65a/65d, 65b/65c, on a top end nearest to integrative edges with the ceiling element (3), respectively, dependent upon the size of the area of the side openings, respectively. Detachment of the side elements (60A, 60B) via the pair of fastening elements (65a/65d, 65b/65c) can be realized by zippers and the furled fastener (605) can be realized by loops and toggles; however, the embodiments are not limited thereto. Alternatively, detachment can be realized by Velcro strips, snap fasteners, and/or tapey snappers etc. and the furled fastener (605) can be realized by string/rope/material strips, hook loop fastening straps, buckle mechanisms, and/or clips mechanisms etc.

In certain embodiments, at least one of the first and second side walls (6A, 6B) can be provided with a roller (not shown), for example, a plastic pole having a diameter smaller than 4 mm. The roller can be mounted to ends of the two side elements (60A, 60B) forming the floor opening (2) for ease of rolling and/or folding and/or to provide additional weight on the two side elements (60A, 60B), particularly, when in a furled state for additional stability and/or sturdiness of the canopy (1), particularly, during forward moving operation of the cargo bicycle (50).

Figure 7:
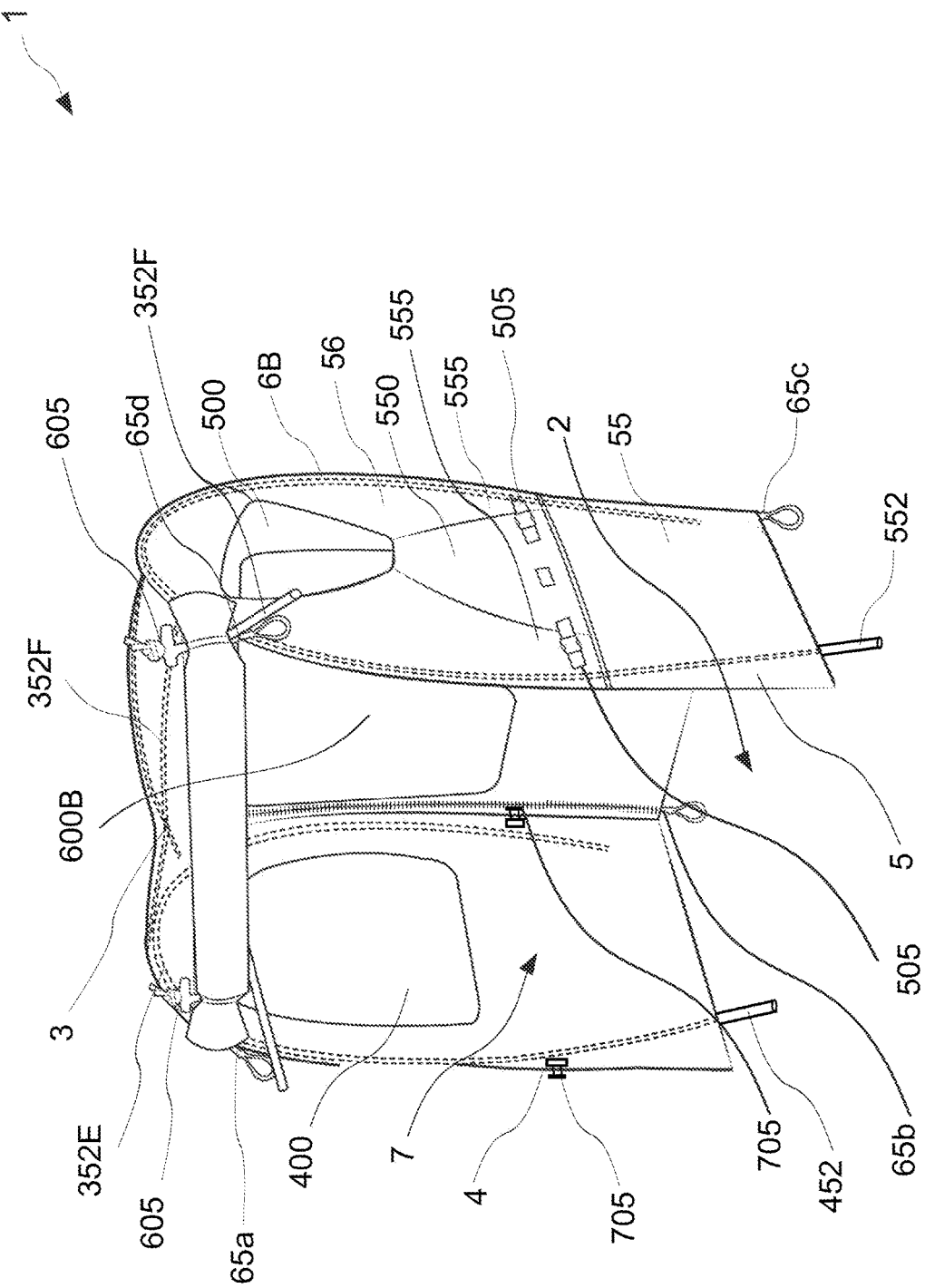
FIG. 7 depicts a representation of the embodiment of the canopy of FIG. 6A, having front and rear spring force arched cross members and pair of diagonal arched ceiling members partial slip-on unmounted.

In certain embodiments, the canopy (1) further comprises a frame structure, at least partially supporting and framing the upper interior space (7), steading and/or stabilizing the cube and/or cuboid shape of the front wall (4), rear wall (5), and first and second side walls (6A, 6B) and generally elliptic paraboloid shape of the ceiling element (3), respectively, comprising a front spring force arched cross member (452), a rear spring force arched cross member (552) and a pair of diagonal arched ceiling members (352F, 352E). FIG. 7 depicts a representation of an embodiment of a canopy of FIG. 1A, having a first side wall detached and having front and rear spring force arched cross members (452, 552) and pair of diagonal arched ceiling members (352F, 352E) partial slip-on unmounted. Referring to FIG. 7, and referring to FIGS. 1A to 6, the pair of diagonal arched ceiling members (352F, 352E) are crosswise bent spring force arranged to form the generally elliptic paraboloid shape, tapering in height toward the front wall (4) and rear wall (5) of the canopy (1), forming the four generally even spaced taut central wedge-like aerodynamic shapes. The bending stiffness of the front spring force arched cross member (452) and/or rear spring force arched cross member (552) is greater than the bending stiffness of the pair of diagonal arched ceiling members (352F, 352E).

The front spring force arched cross member (452), rear spring force arched cross member (552), and pair of diagonal arched ceiling members (352F, 352E) can consist of fiberglass, carbon fiber, and/or composite material, in particular, the diameter dimension of the front spring force arched cross member (452) and/or rear spring force arched cross member (552) can be 7 mm and/or 6 mm, respectively, and the diameter dimension of the pair of diagonal arched ceiling members (352E, 352F) can be 5 mm and/or 4 mm, respectively. Also in particular, the straightened length of the front spring force arched cross member (452) before mounting to the front wall (4) and/or rear spring force arched cross member (552) before mounting to the rear wall (5) can be between 200 cm and 300 cm, inclusive, particularly preferable 220 cm and the straightened length of the pair of diagonal arched ceiling members (352F, 352E) before mounting to the ceiling element (3) can be between 61 cm and 101 cm, inclusive, particularly preferable 81 cm.

In certain embodiments, the front wall (4), rear wall (5) and ceiling element (3) each comprise frame structure receiving inlets near to the front ceiling edge and connection to the first front and rear wall edges, near to the rear ceiling edge and connection to the second front and rear wall edges, and diagonally across the ceiling element (3), respectively. The front spring force arched cross member (452), rear spring force arched cross member (552) and pair of diagonal arched ceiling members (352F, 352E) are assembled, as an example, slip-on mountable, to the front wall (4), rear wall (5) and ceiling element (3) via the frame structure receiving inlets, respectively. The frame structure receiving inlets of the canopy (1) can be made of two and/or more materials and/or fabrics and can be particularly less than 50% in total area, preferably less than 75% in total area, and particularly preferable 100% encased therein.

A reinforced area of the front spring force arched cross member (452) and rear spring force arched cross member (552), both slip-on mounted to the frame structure receiving inlets of the front wall (4) and rear wall (5), respectively, is at least partially, continuously reinforced by the front and rear of the rear safety cage (52) of the cargo bicycle (50), respectively, and are firmly attached thereto by an attachment latcher (705). In particular, the reinforced area is less than 35%, preferably less than 30%, and particularly preferable less than 25% of the area of the front wall (4), rear wall (5) and first and second side walls (6A, 6B), respectively. In particular, the canopy (1) further comprises an attachment latcher (705), in which the canopy (1) is at least partially reinforced by the rear safety cage (52) by the attachment latcher (705).

In certain embodiments, the canopy wall elements comprise at least one window integrated into the front wall (4), the rear wall (5), the first side wall (6A) or the second side wall (6B) or any combination of the foregoing. In particular, the first and second side walls (6A, 6B) can comprise first and second side windows (600A, 600B) integrated therewith, respectively, and on the front wall (4) and rear wall (5), the canopy (1) can comprise at least one front window (400) and at least one rear window (500) integrated therewith, respectively. The first and second side windows (600A, 600B) have a maximum side window area, wherein in particular the maximum side window area is less than 65%, preferably less than 70%, and particularly preferable less than 75% of the first side wall and second side wall (6A, 6B), respectively. The at least one front window (400) has a maximum front window area, wherein the maximum front window area is less than 65%, preferably less than 70%, and particularly preferable less than 75% of the front wall (4). The rear window (500) has a maximum rear window area, wherein the maximum rear window area is less than 10%, preferably less than 20%, and particularly preferable less than 30% of the rear wall (5). In certain embodiments the at least one window is made of a transparent material, a translucent material or a UV resistant material or any combination of the foregoing. As an example, plastic and/or PVC materials.

In certain embodiments, the front window (400), rear window (500), and first and second side windows (600A, 600B) seals, and side elements (60A, 60B) and pair of fastening elements (65a/65d, 65b/65c) detachable seals, are provided so that the upper interior space (7) is protected against moisture and dirt.

Figure 8:
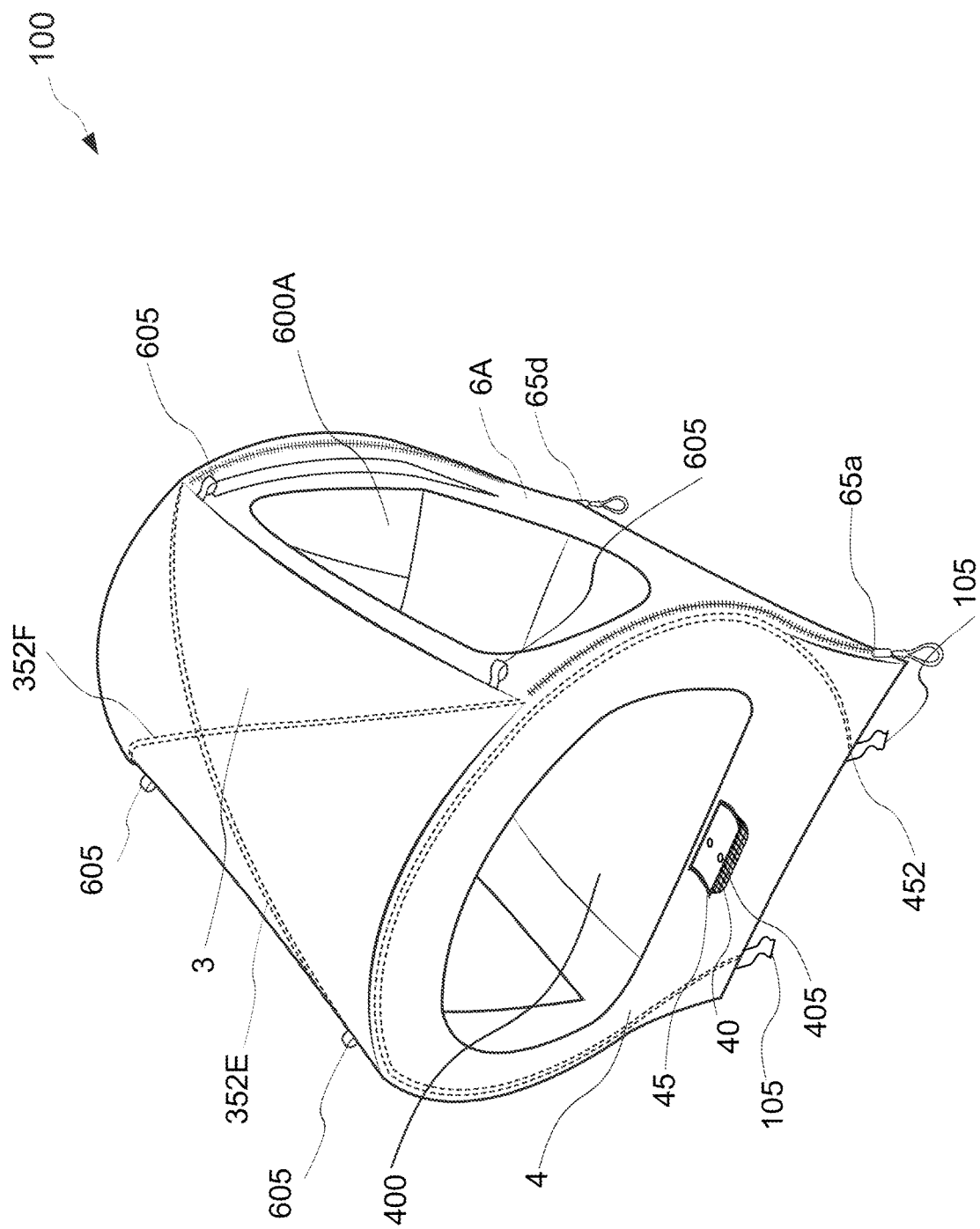
FIG. 8 depicts a representation of an alternative embodiment of a canopy having a front vented opening and cover.

FIG. 8 depicts a representation of an alternative embodiment of a canopy having a front vented opening and cover. Referring to FIG. 8, and referring to FIGS. 1A to 7, in certain embodiments, the canopy (100) comprises a front vented opening formed by at least one front mesh vent element (40) and a corresponding front vented opening cover (45) on the front wall (4). The at least one front mesh vent element (40) can be a meshed structure integrated with and/or to the front wall (4), and consist of material and/or fabrics, and positioned below the front window (400) on the front wall (4) of the canopy (1) and above the rear safety cage (52) of the front wall (4) of the canopy (1). The canopy (1) can be modified between a vented furled state and vented unfurled state. In the vented unfurled state, the at least one front mesh vent element (40) has no front vented opening of the upper interior space (7). In the vented furled state, the at least one front mesh vent element (40) has a front vented opening of the upper interior space (7), in particular the front vented opening is less than 25%, preferably less than 30%, and particularly preferable less than 35% of the area of the front wall (4). The shape of the front vented opening cover (45) is generally quadrilateral shaped and corresponds to the shape of the at least one front mesh vent element (40). The shape of the at least one front mesh vent element (40) and front vented opening cover (45) can have less than four sides, more than four sides, curved shapes, and/or combinations thereof, respectively. The amount of the at least one front mesh vent element (40) and front vented opening cover (45) can be one, two, three, or greater than three, respectively. The canopy (1) comprises furled vented fastener (405), in which the front vented opening cover (45) can be locked in the vented furled state via the furled vented fastener (405).

Figure 9A:
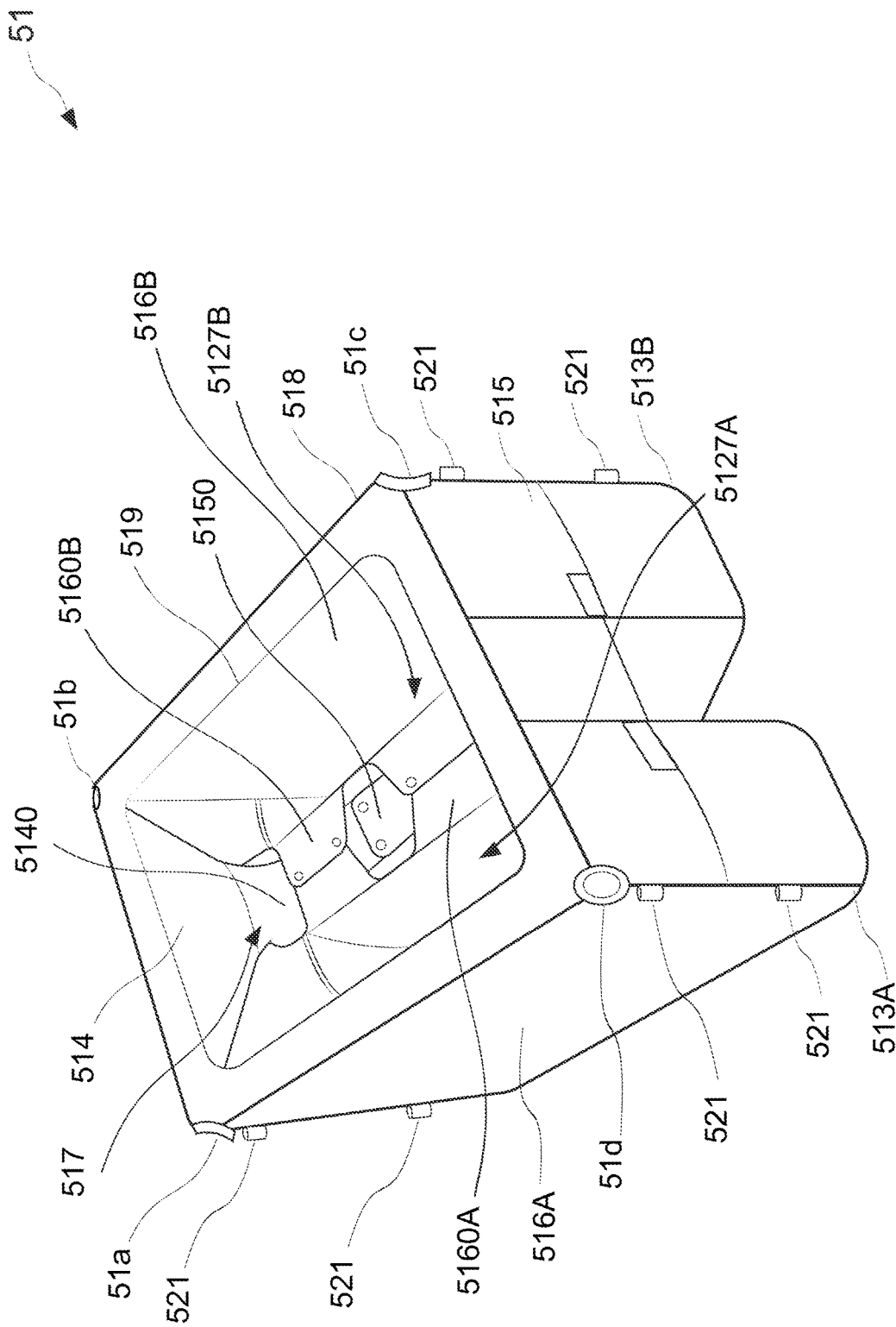
FIG. 9A depicts a representation of an embodiment of a box of FIG. 1A.
Figure 9B:
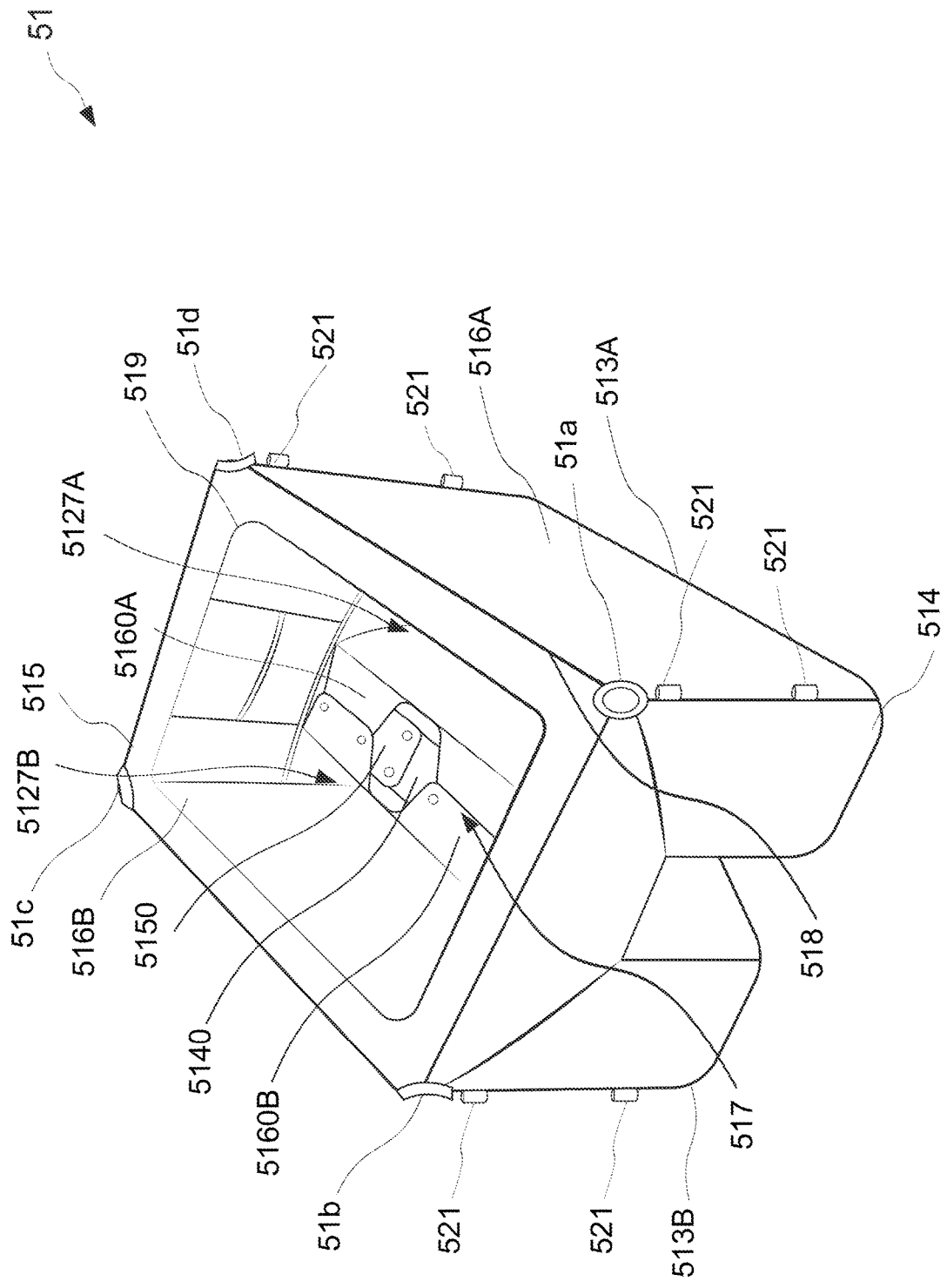
FIG. 9B depicts another representation of the embodiment of the box of FIG. 9A.
Figure 9C:
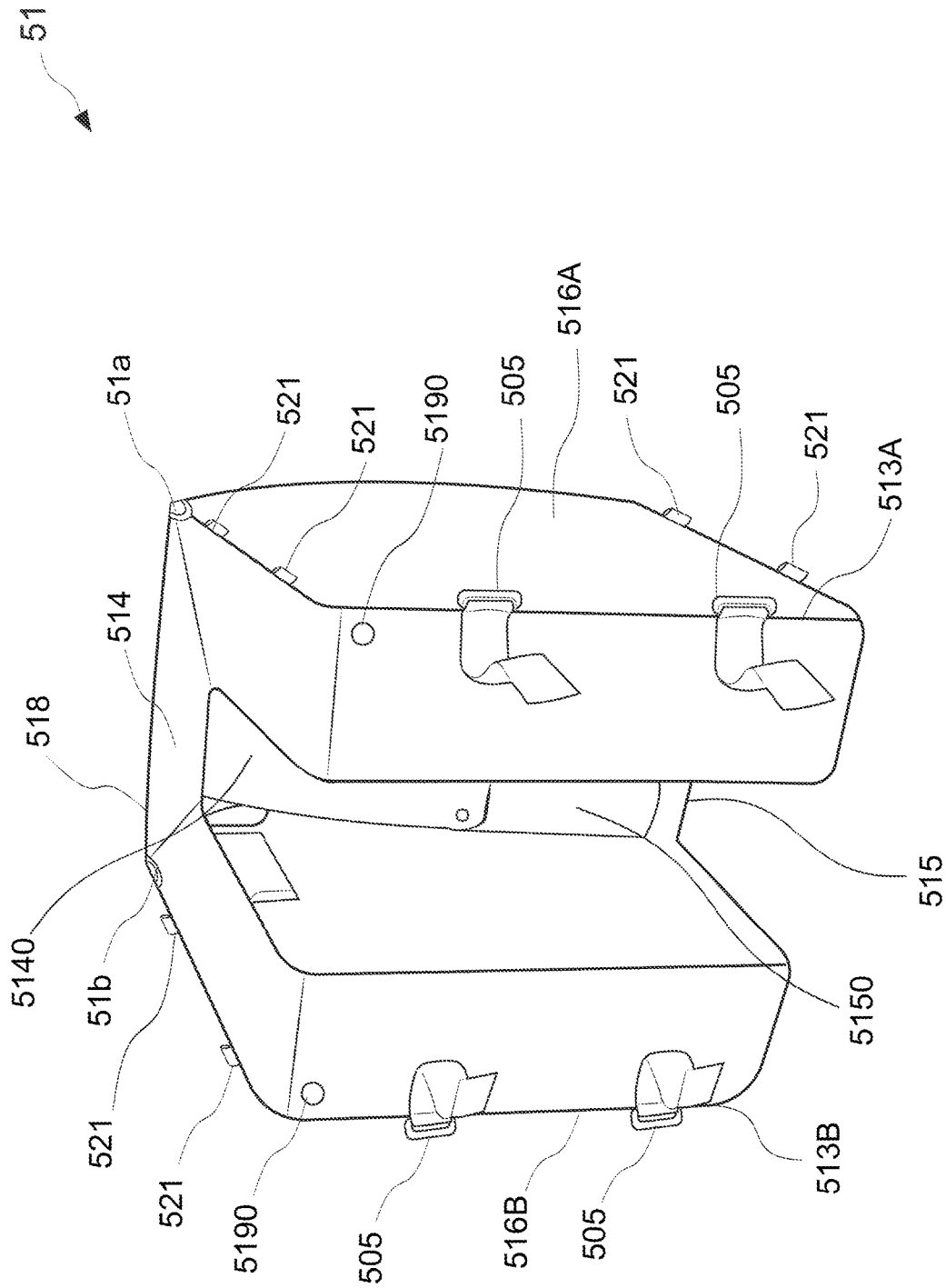
FIG. 9C depicts yet another representation of the embodiment of the box of FIG. 9A.

In some embodiments, the box (51) comprises box wall elements for forming a sturdy soft-shelled seating cabin having a lower interior space (517) and pair of lower interior side spaces (5127A, 5127B) for accommodating passengers (70). FIGS. 9A to 9C depict representations of an embodiment of a box of a cargo bicycle. Referring to FIGS. 9A to 9C, and referring to FIGS. 1A to 8, the box wall elements comprise a first box side element (516A), a second box side element (516B) opposite the first box side element (516A), a first box inner side shaping element (5160A), a second box inner side shaping element (5160B), a front box element (514), a front inner seat shaping element (5140), a rear box element (515) opposite the front box element (514), and a rear inner seat shaping element (5150). The first box inner side shaping element (5160A) extends from a first perimeter edge (513A) of the first box side element (516A) and the second box inner side shaping element (5160B) extends from a second perimeter edge (513B) of the second box side element (516B). The front box element (514) extends from front side edges of the first and second box side elements (516A, 516B) and first and second box inner side shaping elements (5160A, 5160B), respectively. The rear box element (515) extends from rear side edges of the first and second box side elements (516A, 516B) and first and second box inner side shaping elements (5160A, 5160B), respectively. The front box element (514) and rear box element (515) and first and second box side elements (516A, 516B) are generally of the same sizes and shapes and positioned on corresponding opposing sides of the lower interior space (517) and pair of lower interior side spaces (5127A, 5127B), respectively, integrative combined. The front inner seat shaping element (5140), rear inner seat shaping element (5150), first box inner side shaping element (5160A) and second box inner side shaping element (5160B) are generally of the same sizes and shapes and positioned on corresponding opposing sides of the pair of lower interior side spaces (5127A, 5127B), respectively. The first and second box elements (516A, 516B) form a generally cube and/or cuboid shape. The front box element (514) and rear box element (515) form a generally U-shape, in which the opening of the U is positioned facing downward, opposite the lower interior space (517). The front box element (514) is integrative combined with the front inner seat shaping element (5140), the rear box element (515) is integrative combined with the rear inner seat shaping element (5150), and the first and second box side elements (516A, 516B) are integrative combined with the first and second box inner side shaping elements (5160A, 5160B), respectively.

In certain embodiments, the first box inner side shaping element (5160A) has at least a first inner seat shaping element flap extending therefrom, the second box inner side shaping element (5160B) has at least a second inner seat shaping element flap extending therefrom, the front box element (514) has a front inner seat shaping element (5140) extending centrally therefrom and the rear box element (515) has a rear inner seat shaping element (5150) extending centrally therefrom. The front inner seat shaping element (5140) is fastenable to the rear inner seat shaping element (5150) and the first box inner side shaping element (5160A) is fastenable to the second box inner side shaping element (5160B), for example, by flap box fasteners, such as Velcro strips, snap fasteners, and/or tapey snappers etc.

The first box side element (516A), second box side element (516B), front box element (514), and rear box element (515) at least partially define the lower interior space (517) and the first box side element (516A), second box side element (516B), front box element (514), rear box element (515), first box inner side shaping element (5160A), and second box inner side shaping element (5160B) at least partially define the pair of lower interior side spaces (5127A, 5127B), respectively. The bottom portions of the front box element (514), rear box element (515), and first and second box side elements (516A, 516B) form the front, rear, outer sides, and bottoms of the pair of lower interior side spaces (5127A, 5127B). The first and second box inner side shaping elements (5160A, 5160B) form the inner sides of the pair of lower interior side spaces (5127A, 5127B). Top openings of the pair of lower interior side spaces (5127A, 5127B) are generally flush and integrated with a bottom opening of the lower interior space (517). One passenger, in particular two passengers can occupy the lower interior space (517) and pair of lower interior side spaces (5127A, 5127B) during operation of the cargo bicycle (50).

The box (51) comprises a smaller area elastic edge (519), an upper perimeter edge (518) and two lower perimeter side edges (513A, 513B). The area dimensions of the smaller area elastic edge (519) is smaller than area dimensions of the upper perimeter edge (518), providing an inward tautening pulling force from the upper perimeter edge (518), resulting in a tight and snug fit on the perimeter formed by the front bar (524), rear bar (525), and pair of side bars (526A, 526B). The smaller area elastic edge (519) can be an elastic band and/or strip. The box (51) comprises two front attachment holes (51a, 51b) and two rear attachment holes (51d, 51c) through each corner of the upper perimeter edge (518), respectively. The two front attachment holes (51a, 51b) and two rear attachment holes (51d, 51c) can be structurally strengthened by washer-like plastic, metal, material, and/or fabric pieces integrated surrounding the two front attachment holes (51a, 51b) and two rear attachment holes (51d, 51c). The box (51) further comprises at least an attachment receiver (521). In certain embodiments, the box (51) comprises eight attachment receivers (521), as an example, for sliding flexible poles therethrough having at least a banner, advertisement and/or decorative material or fabric attached therebetween, for viewing on the first and second box side elements (516A, 516B), respectively. In certain embodiments, the box (51) further comprises at least a pair of footboard attachment fasteners (505) disposed near to the first and second perimeter edges (513A, 513B), respectively. Attachment of the box (51) to the pair of footboards (54A, 54B) is via the at least a pair of footboard attachment fasteners (505). As an example, the box (51) further comprises two pairs of footboard attachment fasteners (505), two on each first and second perimeter edges (513A, 513B), respectively. In certain embodiments, the box (51) further comprises at least two box drainage outlets (5190), one hole on each bottom portion of the first and second box side elements (516A, 516B), respectively.

Figure 10:
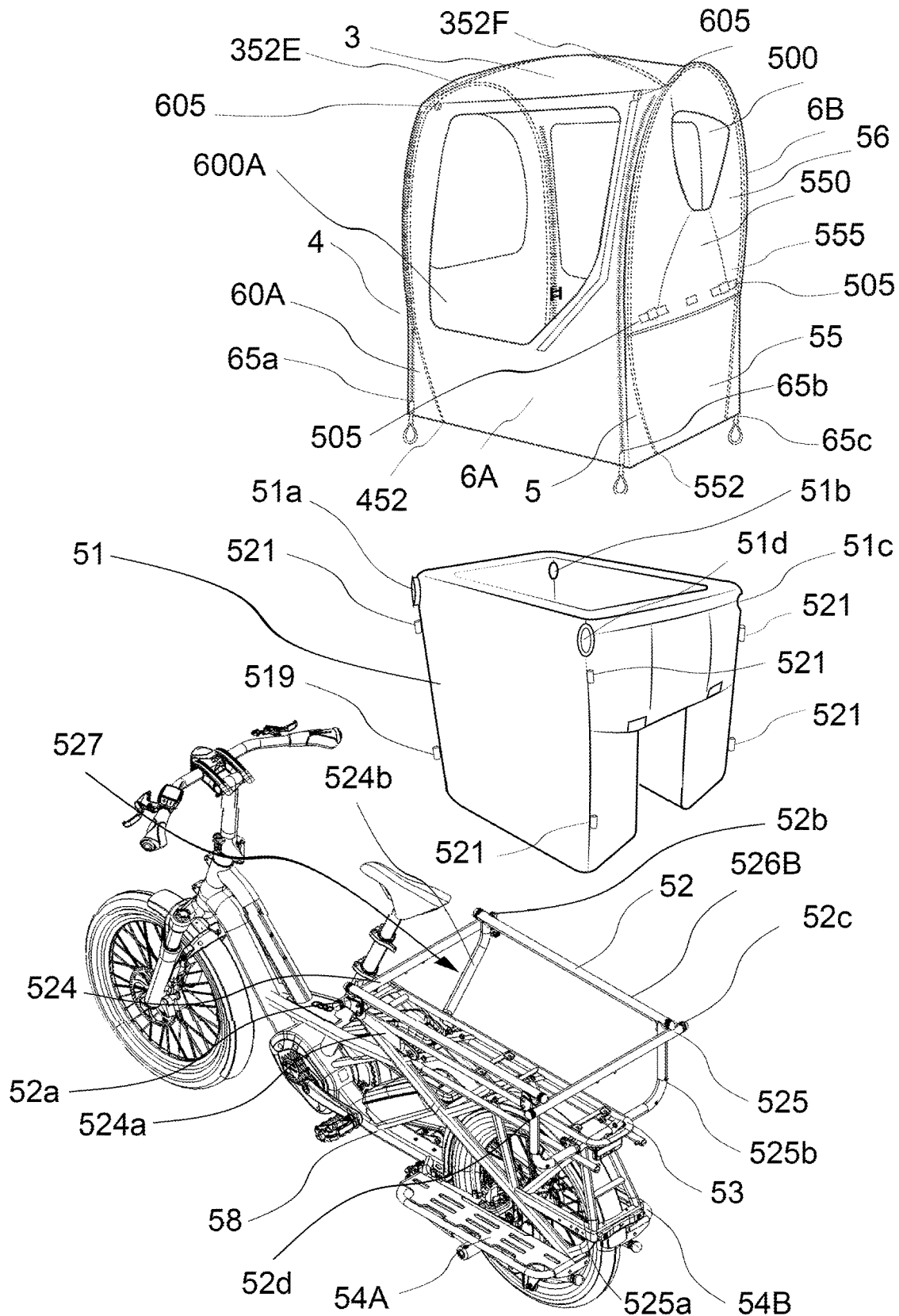
FIG. 10 depicts an exploded view of the embodiment of the passenger cabin mounted to the cargo bicycle of FIG. 1A.

The canopy (1) is at least partially and the box (51) is at least reinforced by the rear safety cage (52) by flush tight attachment to the first and second front protruding ends (52a, 52b) and first and second rear protruding ends (52d, 52c), respectively. FIG. 10 depicts an exploded view of the embodiment of the passenger cabin mounted to the cargo bicycle of FIG. 1A. Referring to FIG. 10, and referring to FIGS. 1A to 9C, in certain embodiments, the attachment of the canopy (1) to the first and second front protruding ends (52a, 52b) and first and second rear protruding ends (52d, 52c) is by expedient slip-on attachment. In certain embodiments, the attachment of the box (51) to the first and second front protruding ends (52a, 52b) and first and second rear protruding ends (52d, 52c) is by expedient slip-on attachment.

Under an exploded view, it should be understood that some elements are shown "floating" on each other for the sake of clarity. The box (51) is at least reinforced by the rear safety cage (52), rear carrier rack (53) and pair of footboards (54A, 54B) of the cargo bicycle (50) by tight fitting over the rear safety cage (52) and attachment to the pair of footboards (54A, 54B), respectively. The two front attachment holes (51a, 51b) and two rear attachment holes (51d, 51c), correspond in dimensions with the first and second front protruding ends (52a, 52b) and first and second rear protruding ends (52d, 52c), respectively, and are tightly slip-on attached therethrough, in which the first and second front protruding ends (52a, 52b) and first and second rear protruding ends (52d, 52c) at least partially, protrude through the two front attachment holes (51a, 51b) and two rear attachment holes (51d, 51c), respectively, and an inner surface of the upper perimeter edge (518) rests flush with and/or correspond to and/or stretched to the dimensions of a perimeter formed by the front bar (524), rear bar (525), and pair of side bars (526A, 526B), allowing the box (51) to be reinforced by the rear safety cage (52). Additionally, the smaller area elastic edge (519), providing an inward tautening pulling force from the upper perimeter edge (518), allows the box (51) to be further reinforced by the rear safety cage (52). Following, the rear inner seat shaping element (5150) and front inner seat shaping element (5140) are fastened together below an underside of the rear carrier rack (53) and the two box shaping elements (5160A, 5160B) are fastened together above a topside of the rear carrier rack (53). The heights of the box (51) from a side view plane from the upper perimeter edge (518) to the two lower perimeter side edges (513A, 513B), respectively, are generally equal to the height of the front bar (524), rear bar (525), and pair of rear supporting bars (525d, 525c) from a side plane view to a top of the pair of footboards (54A, 54B), respectively, allowing the box (51) to also be reinforced by the pair of footboards (54A, 54B). Additionally, the footboard attachment fasteners (505), being tightly fastened to the pair of footboards (54A, 54B), respectively, allows the box (51) to be reinforced by the pair of footboards (54A, 54B).

The canopy (3) is at least reinforced by the rear safety cage (52) of the cargo bicycle (50) by tight fitting over and/or attachment latcher (705) to the rear safety cage (52), and/or bending stiffness of the front spring force arched cross member (452) and/or a rear spring force arched cross member (552). The attachment latcher (705), correspond in dimensions with the first and second front protruding ends (52a, 52b) and first and second rear protruding ends (52d, 52c), respectively, and are tightly slip-on attached therethrough, in which the first and second front protruding ends (52a, 52b) and first and second rear protruding ends (52d, 52c) at least partially, protrude through the attachment latcher (705), respectively, and a plane area formed by the floor opening (2) tightly fits over a plane area formed by the front bar (524), rear bar (525), and pair of side bars (526A, 526B), forming a top plane of the interior seating space (527) of the rear safety cage (52), allowing the canopy (1) to be reinforced by the rear safety cage (52). A plane area formed by the floor opening (2) is generally above or in line with or below a plane area formed by the rear carrier rack (53), allowing the canopy (1) to be reinforced by the rear safety cage (52).

Figure 11:
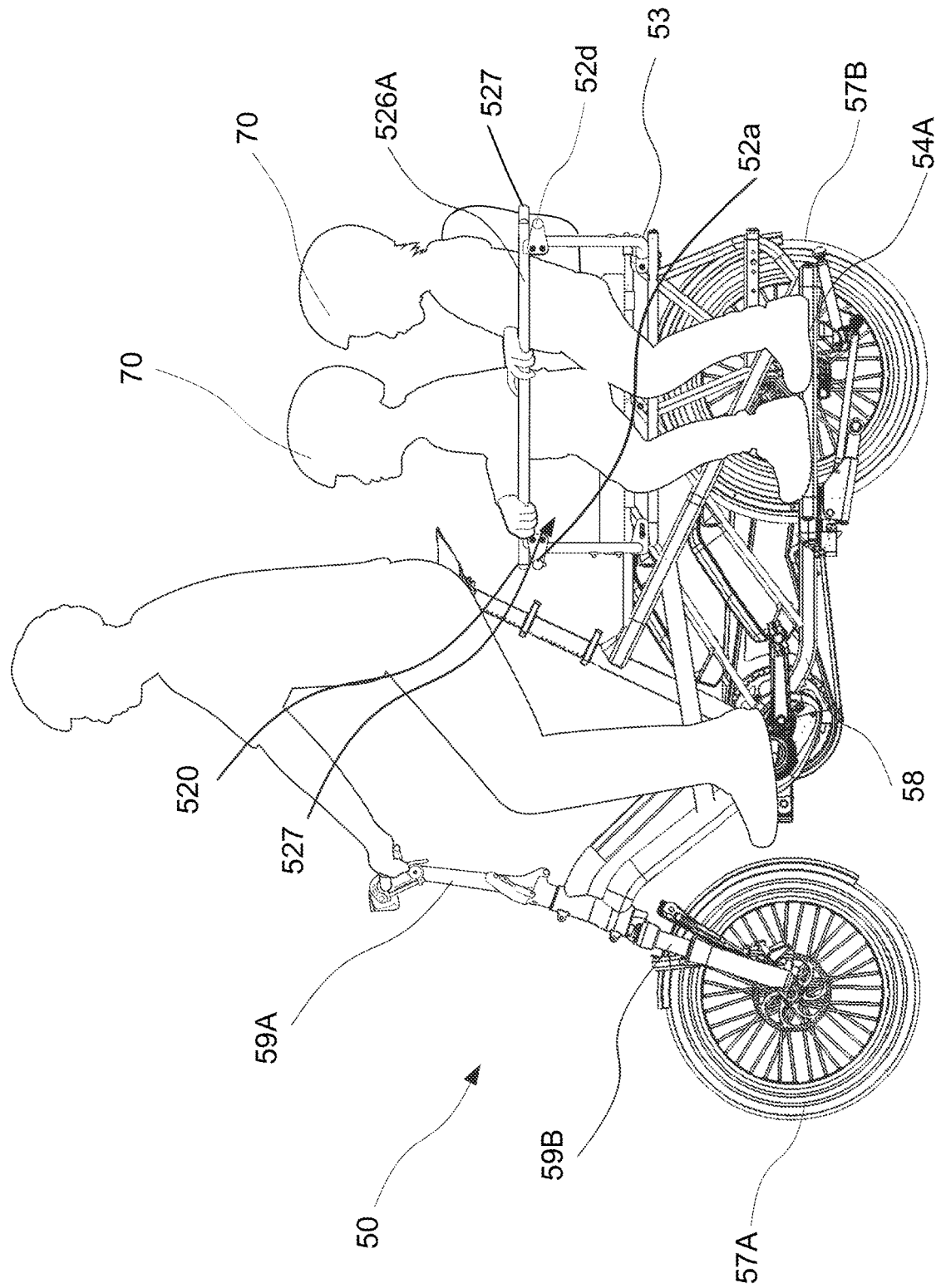
FIG. 11 depicts a representation of an alternative embodiment of a rear safety cage and pair of footboards mounted to a frame of a cargo bicycle, accommodating and protecting passengers.

FIG. 11 depicts a representation of an alternative embodiment of a rear safety cage and pair of footboards mounted to a frame of a cargo bicycle, accommodating and protecting passengers. Referring to FIG. 11, and referring to FIGS. 1A to 10, in certain embodiments, the rear safety cage (520) comprises bar elements for forming the seating space (517). The bar elements comprise a front bar (524), a pair of front supporting bars (524a, 524d), an expanded rear bar (527), a pair of rear supporting bars (525b, 525c) and pair of side bars (526A, 526B), wherein the rear safety cage (520) comprises first and second front protruding ends (52a, 52b) and first and second rear protruding ends (52d, 52c). The front bar (524) forms the first and second front protruding ends (52a, 52b) and the expanded rear bar (527) forms the first and second rear protruding ends (52d, 52c). The front bar (524) is positioned opposite and parallel to the expanded rear bar (527) and the pair of side bars (526A, 526B) are positioned opposite and parallel to each other and on two same opposing ends of the front bar (524) and expanded rear bar (527) to generally form a quadrilateral shape. The expanded rear bar (527) can be outwardly protruded from a center thereof, forming an elongated U-shape. The elongated U-shape provides additional back space for passengers (70) seated within the upper interior space (7) and lower interior space (517) and against the expanded rear bar (527), for, as an example, additional items on passengers (70) backs, such as backpacks and/or thick clothing and/or items. The pair of front supporting bars (524a, 524d) are attached to front ends of each of the pair of side bars (526A, 526B), respectively, and is formed generally diagonally inward, whereby the pair of front supporting bars (524a, 524b), front bar (524) and rear carrier rack (53) form a generally trapezoid shape. The pair of rear supporting bars (525b, 525c) are attached to rear ends of each of the pair of side bars (526A, 526B), respectively, and is formed generally L-shaped inward, whereby the pair of rear supporting bars (524a, 524b), rear bar (525) and rear carrier rack (53) form a generally quadrilateral shape.

Figure 12:
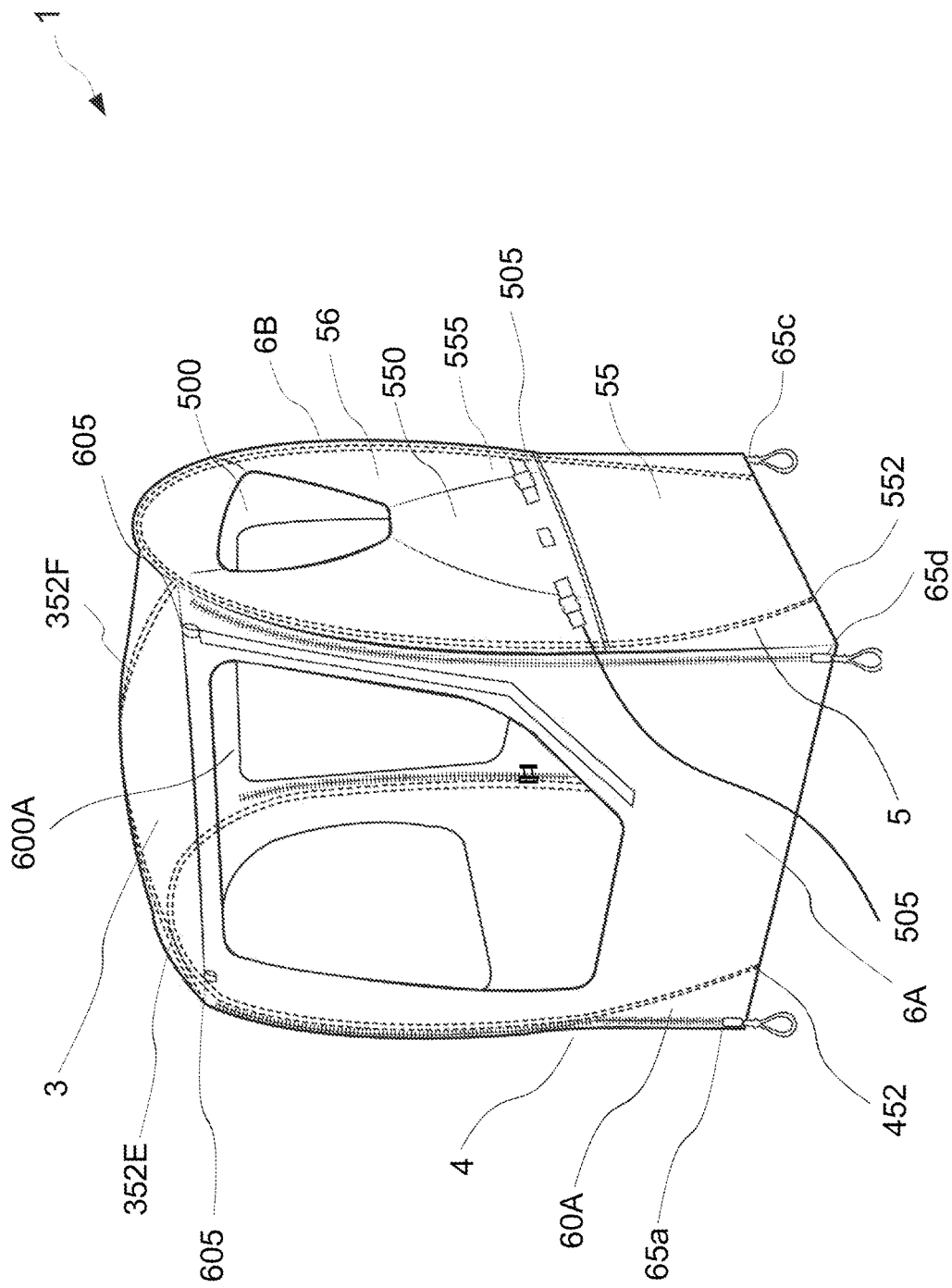
FIG. 12 depicts a representation of an embodiment of a canopy of FIG. 1A.

In certain embodiments, the rear wall (5) comprises an upper rear element (56) and a lower rear element (55). FIG. 12 depicts a representation of an embodiment of a canopy of FIG. 1A. Referring to FIG. 12, and referring to FIGS. 1A to 11, the upper rear element (56) overlaps and is expandable against the lower rear element (55), whereby a volume of the upper interior space (7) can be modified. The upper rear element (56) has an expansive element (550), a non-expansive elements (555) and a pair of adjustable fasteners (505). The expansive element (550) is integrated centrally into a lower side of the upper rear element (56) against the non-expansive elements (555) and below the rear window (500) of the canopy (1). Each of the pair of adjustable fasteners (505) is on opposite sides of the expansive element (550) and non-expansive elements (555) near to a lower edge of the upper rear element (56). When the pair of adjustable fasteners (505) are released, the expansive element (550) expands a volume of the upper interior space (7) to an expansive state, in which the upper interior space (7) has a maximum volume. When the pair of adjustable fasteners (505) are fastened, the volume of the upper interior space (7) is contracted to a non-expansive state, in which the upper interior space (7) has a non-expansive volume. In particular the non-expansive volume is less than 5%, preferably less than 10%, and particularly preferable less than 15% of the maximum volume. The expanded dimensions of the expansive element (550) can generally accommodate the expanded dimensions of the expanded rear bar (527).

In some embodiments, the front bar (524), pair of front supporting bars (524a, 524b), rear bar (525), pair of rear supporting bars (525d, 525c) and pair of side bars (526A, 526B) of the rear safety cage (52) forming the interior seating space (527) and pair of footboards (54A 54B) may consist of metals and/or alloys. In particular mild steel, preferably stainless steel, and/or particularly preferable, aluminum.

In some embodiments, at least one of the canopy (1) or box (51) or any combination of the foregoing, is made of a waterproof, a showerproof, a moisture wicking, a quick drying, a wind resistant, a dirt resistant, a mildew resistant, an oil resistant, a salt resistant, a chemical resistant or a UV ray resistant material or coating or any combination of waterproof, showerproof, moisture wicking, quick drying, wind resistant, dirt resistant, mildew resistant, oil resistant, salt resistant, chemical resistant and UV ray resistant material or coating. In particular, polyester and/or nylon and/or Taslan materials with sufficient strength and/or stability and/or soft and/or deformable material and/or fabrics and/or PVC coatings. The described parts of the canopy (1) and box (51) may be single-ply, two-ply, and/or three-ply and/or more than three-ply and/or single-layered, two-layered, and/or three-layered and/or more than three-layered materials and/or fabrics.

For the canopy (1) and box (51) outer seals can be provided in the region of edges, so that in addition to the materials and/or fabrics and/or coatings, the upper interior space (7), the lower interior space (5127A, 5127B) and pair of lower interior side spaces (5127A, 5127B), respectively, are protected against moisture and dirt.

In some embodiments, the cargo bicycle (50) further comprises at least one of a passenger bike seat, passenger bike seat having back support or child bike seat or any combination of the foregoing, mounted to at least the rear carrier rack (53), opposite the rear wheel (57B), supporting passengers (70) when in a seated position on the cargo bicycle. The passenger bike seats and/or rack mount child bike seats can be mounted on the rear carrier rack (53) of the cargo bicycle (1). In some embodiments, the cargo bicycle (50) is at least one of a pedal, pedal-based electric assist or electric cargo bicycle.

The term "cargo bicycle" in the present context is understood to mean any pedal, pedal-based electric assist, electric, 2-wheeled, 3-wheeled, or 4-wheeled bicycles, suitable for use in having a passenger cabin (10) attached thereto.

In some embodiments, the furled fastener (605), attachment latcher (705), pair of adjustable fasteners (505) and/or footboard attachment fasteners (505) may consist of plastic, metal, and/or fabric material, in particular, string/rope/material strips, hook loop fastening straps, buckle mechanisms, and/or clips mechanisms etc. and be designed in several parts or in one piece.

The passenger cabin for cargo bicycles, forming an upper interior space (7), a lower interior space (517) and a pair of lower interior side spaces (5127A, 5127B) for accommodating passengers (70) and protecting passengers (70) from natural or human-made environmental elements, for example, rain, wind, snow, cold, etc. or dust or sand from construction etc., is designed such that it is protective, modifiable, lightweight, storable and/or transportable in a smaller size, stable and sturdy, convenient and easy to assemble, and weatherproof. A passenger cabin (10) is reinforced by the rear safety cage (52), rear carrier rack (53) and pair of footboards (54A, 54B) of a cargo bicycle (50).

The first and second front protruding ends (52a, 52b) and first and second rear protruding ends (52d, 52c) of the pair of side bars (526A, 526B) of the rear safety cage (52), respectively, protrude outwardly from the rear safety cage (52), providing protection to the hands of passengers (70) when gripping the pair of side bars (526A, 526B) and protection to the sides of the bodies of passengers (70) when in a seated position on the cargo bicycle (50) from injury due to sideward falling down of the cargo bicycle (50) and/or side swipes from vehicles, walls and/or hard structures etc. when parked and/or during moving operation of the cargo bicycle (50).

The passenger cabin (10) may be made of at least a waterproof fabric material of sufficient strength, providing weatherproofing, deformability to a smaller size when stored or transported, and a light weight. Side elements (60A, 60B) and detachable side fastening elements (65a/65d, 65b/65c) of the canopy (1) are provided to modify openings of the upper interior space (7) between furled and unfurled states. A frame structure of the canopy (1) comprising a front spring force arched cross member (452) and a rear spring force arched cross member (552), at least partially reinforced by the rear safety cage (52), and pair of diagonal arched ceiling members (352E, 352F), providing a crosswise bent spring force and forming four approximately central wedge-like aerodynamic shapes, is provided.

The front spring force arched cross member (452), rear spring force arched cross member (552), and pair of diagonal arched ceiling members (352F, 352E) may be made of lightweight, strong, and sturdy fiberglass, carbon fiber, and/or composite material. A greater bending stiffness of the front and/or rear spring force arched members (452, 552) tightly attached flush with a front bar (524) and rear bar (525) of the rear safety cage (52) by a simple attachment latcher (705), providing crosswise stretching tension, and crosswise bent spring force arrangement of the pair of diagonal arched ceiling members (352E, 352F), provide protective, stable and sturdy framing of the upper interior space (7).

Each of the pair of lower interior side spaces (5127A, 5127B) of the box (51) is a self-contained vessel, providing protection to the lower extremities of passengers (70) from components of the cargo bicycle (50), such as spinning bike wheel spokes, and debris, such as dirt, gravel, mud, sand etc. kicked up from dirt and/or gravel roads and/or dirty puddles and rivulets, during moving operation of the cargo bicycle (50).

The smaller area dimensions of the smaller area elastic edge (519) versus the upper perimeter edge (518), providing an inward tautening pulling force from the upper perimeter edge (518), allows the box (51) to be further reinforced by the rear safety cage (52) via a tight and snug fit on the perimeter formed by the front bar (524), rear bar (525), and pair of side bars (526A, 526B) by simple tight slip-on attachment of the two front attachment holes (51a, 51b) and two rear attachment holes (51d, 51c) to the first and second front protruding ends (52a, 52b) and first and second rear protruding ends (52d, 52c), respectively.

The at least a first inner seat shaping element flap of the first box inner side shaping element (5160A), the at least a second inner seat shaping element flap of the second box inner side shaping element (5160B), the front inner seat shaping element (5140), and the rear inner seat shaping element (5150), providing Velcro strips, snap fasteners, and/or tapey snappers etc. fastening ability, allow for convenient and easy assembly of the box (51) to the rear carrier rack (53) of the cargo bicycle (50).

Thus, a minimal member, four members, lightweight, weatherproof and storable and/or transportable in a smaller size, waterproof fabric material and fiberglass, carbon fiber, and/or composite material, convenient and simpler attachment, protruding ends (52a, 52b, 52d, 52c), simple attachment latcher (705), integrated attachment holes (51a, 51b, 51d, 51c), simple fastening of the first and second inner seat shaping element flaps and front and rear inner seat shaping elements (5140, 5150), convenient handling, tensioned and spring force and attachment design, protective, stable and sturdy, protruding ends (52a, 52b, 52d, 52c), the canopy (1) and frame structure, inward tautening pulling force of the smaller area elastic edge (519) and self-contained pair of lower interior side spaces (5127A, 5127B) vessels, and modifiable, between furled and unfurled states, passenger cabin (10) is provided for users. The canopy (1) is designed as a sturdy soft-shelled viewing cabin having an upper interior space (7) and the box (51) is designed as a sturdy soft-shelled seating cabin having a lower interior space (517) and a pair of lower interior side spaces (5127A, 5127B) for accommodating and protecting passengers (70) from natural or human-made environmental elements.

By providing side opening modification means, it is possible to change side openings of the upper interior space (7) and thus vary the interior environment of the canopy (1) conveniently, while still protecting passengers (70) from natural or human-made environmental elements. In particular the canopy (1) can be modified between a furled state, in which the at least one side element has a side opening of the upper interior space (7), and an unfurled state, in which the at least one side element has no side opening of the upper interior space (7). If a temperature of the interior environment is needed to be lowered and/or it is preferred by passengers (70) for comfort and/or prevention of motion sickness is needed etc., users can modify the canopy (1) to more than one furled state. Each of two side elements (60A, 60B) of the canopy (1) can be separately opened completely and/or optionally, in spaced intervals, by rolling and/or folding and one-step central, for complete opening or two-step side, for spaced intervals or optionally, complete opening, attachment. If protection from outside weather elements is needed, for example, rain, wind, snow, cold, etc., users can modify the canopy (1) to more than one unfurled state. In particular, the side opening is less than 50%, preferably less than 75%, and particularly preferable less than 90% of the area of a respective side wall of the at least one side element. The canopy (1) can be in the furled and unfurled states while parked and during moving operation of the cargo bicycle (50).

By providing a frame structure for framing of the upper interior space (7), following modification of the side openings of the upper interior space (7) and thus varying the interior environment of the canopy (1), the canopy (1) remains protective, stable and sturdy while parked and during moving operation of the cargo bicycle (50). In particular, the frame structure comprises a front spring force arched cross member (452), a rear spring force arched cross member (552), and a pair of diagonal arched ceiling members (352E, 352F), four members, which are slip-on mounted to the canopy (1) for minimal parts and simple attachment. A greater bending stiffness of the front and/or rear spring force arched members (452, 552), edge mounting position on the front wall (4) and rear wall (5), respectively, and crosswise bent spring force arrangement of the pair of diagonal arched ceiling members (352E, 352F), provides tautening spring forces for protective, stable and sturdy framing of the upper interior space (7).

By providing the smaller area elastic edge (519), an inward tautening pulling force from the upper perimeter edge (518) is exerted, allowing the box (51) to be further reinforced by the rear safety cage (52) via a tight and snug fit on the perimeter formed by the front bar (524), rear bar (525), and pair of side bars (526A, 526B), for a protective, stable and sturdy lower interior space (517) and pair of lower interior side spaces (5127A, 5127B).

By providing the attachment latcher (705) of the canopy (1), two front attachment holes (51a, 51b) and two rear attachment holes (51d, 51c) and first and second inner seat shaping element flaps and front and rear inner seat shaping elements (5140, 5150) of the box (51), the canopy (1) and box (51) can be tightly slip-on mounted to the cargo bicycle (50) through the first and second front protruding ends (52a, 52b) and first and second rear protruding ends (52d, 52c) of the rear safety cage (52), and the box (51) can be further fastened together, conveniently and simply, providing crosswise stretching tension and self-contained pair of lower interior side spaces (5127A, 5127B) vessels, while also allowing for convenient and simple removal.

By providing a greater bending stiffness of the front and/or rear spring force arched members (452, 552), when the canopy (1) is attached to the rear safety cage (52) and in an unfurled state, the front wall (4) and rear wall (5) comprise a reinforced area. In particular, the reinforced area is the area of the front wall (4) and rear wall (5) having the greater bending stiffness front and/or rear spring force arched members (452, 552), respectively, flush with the front bar (524) and rear bar (525) of the rear safety cage (52) for stability and sturdiness of the canopy (1), particularly preferable during moving operation of the cargo bicycle (50). The reinforced area of first and second side walls (6A, 6B) is provided when either or both of the first and second side walls (6A, 6B) of the canopy (1) is/are in an unfurled state, wherein at least a part of the tightly slip-on mounted two side walls (6A, 6B), respectively, when in an unfurled state, is/are flush with a pair of side bars (526A, 526B) of the rear safety cage (52), respectively. When either or both of the first and second side walls (6A, 6B) of the canopy (1) is/are in a furled state, the crosswise bent spring force arrangement of the pair of diagonal arched ceiling members (352E, 352F) compensate for the decreased reinforcement provided by the rear safety cage (52) for stability and sturdiness of the canopy (1), particularly preferable during moving operation of the cargo bicycle (50).

In the furled state, the reinforcement of the front spring force arched cross member (452) and rear spring force arched cross member (552) by the front bar (524) an rear bar (525) of the rear safety cage (52) of the cargo bicycle (50), respectively, firm attachment of the canopy (1) to the rear safety cage (52) by the attachment latcher (705), and bending stiffness of the front spring force arched cross member (452) and/or a rear spring force arched cross member (552), being greater than the bending stiffness of the pair of diagonal arched ceiling members (352E, 352F), provide the canopy (1) with stiffness against front to rear airflow during forward moving operation of the cargo bicycle (50). The bending stiffness of the pair of diagonal arched ceiling members (352E, 352F) being less than the front spring force arched cross member (452) and/or a rear spring force arched cross member (552), and aerodynamic shape of the tapered ceiling element (3) in height toward the front wall (4) and rear wall (5) of the canopy (1), provide the canopy (1) with a lighter weight on the ceiling element (3) and lighter weight of the canopy (1), stiffness against side to side airflow during operation of the cargo bicycle (50), a higher height toward the center of the ceiling element (3) for head positioning of passengers (70), and aerodynamic front to rear and side to side shapes when parked and during moving operation.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112f unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A cargo bicycle having a frame, a front fork, a front wheel mounted to the front fork, a rear wheel mounted to the frame, a rear carrier rack connected to the frame near to the rear wheel, and a steering assembly having a handlebar assembled to the front fork and journaled to the frame, comprising:
   a rear safety cage mounted to the frame, at least partially surrounding the rear carrier rack, comprising cage bar elements, forming a seating space;
   a pair of footboards mounted to the frame on opposite sides of the rear wheel, forming foot platforms;
   a passenger cabin mounted to the rear safety cage, the rear carrier rack and the pair of footboards, forming an interior passenger space for accommodating passengers and protecting passengers from natural or human-made environmental elements, comprising:

a canopy, comprising canopy wall elements, forming a sturdy, soft-shelled viewing cabin having an upper interior space, the canopy at least partially reinforced by the rear safety cage; and a box, comprising box wall elements, forming a soft-shelled seating cabin having a lower interior space and a pair of lower interior side spaces extending outwardly from the lower interior space, straddling the rear wheel, the lower interior space reinforced by the rear safety cage and the rear carrier rack and each of the pair of lower interior side spaces reinforced by each of the pair of footboards, respectively, wherein each of the pair of lower interior side spaces is a self-contained vessel, further protecting lower extremities of passengers from components of the cargo bicycle and debris during operation of the cargo bicycle.

2. The cargo bicycle of claim 1, wherein the cage bar elements comprise a pair of side bars, spaced apart and parallel, a pair of front supporting bars, each connected to front ends of each of the pair of side bars, respectively, a pair of rear supporting bars, each connected to rear ends of each of the pair of side bars, respectively, spaced apart from the pair of front supporting bars, a front bar connected to each of the pair of front supporting bars, and a rear bar connected to each of the pair of rear supporting bars, wherein the front bar has a first front protruding end and a second front protruding end opposite the first front protruding end and the rear bar has a first rear protruding end and a second rear protruding end opposite the first protruding end, the first front protruding end is on a same side as the first rear protruding end, whereby the canopy is at least partially reinforced by the rear safety cage and the box is at least reinforced by the rear safety cage by attachment to the first and the second front protruding ends and the first and the second rear protruding ends, respectively.

3. The cargo bicycle of claim 2, wherein attachment of the canopy to the first and the second front protruding ends and the first and the second rear protruding ends is by slip-on attachment.

4. The cargo bicycle of claim 2, wherein attachment of the box to the first and the second front protruding ends and the first and the second rear protruding ends is by slip-on attachment.

5. The cargo bicycle of claim 2, wherein the first and the second front protruding ends and the first and the second rear protruding ends protect hands of passengers when holding on to the pair of side bars and bodies of passengers when in a seated position on the cargo bicycle due to sideward falling down of the cargo bicycle or side swipes from vehicles, walls or hard structures.

6. The cargo bicycle of claim 1, wherein the canopy wall elements comprise a floor opening, a ceiling element opposite the floor opening, a front wall extending from a front ceiling edge of the ceiling element, a rear wall extending from a rear ceiling edge of the ceiling element opposite the front wall and a first side wall and a second side wall, each extending from opposite side ceiling edges of the ceiling element between the front and the rear ceiling edges and each connected to a first front wall edge of the front wall and a first rear wall edge of the rear wall, and a second front wall edge of the front wall and a second rear wall edge of the rear wall, respectively, wherein at least one of the first and the second side walls comprise a pair of fastening elements positioned along respective front and rear detachable edges of the first and second side walls, the front and the rear detachable edges positioned near to the connection to the front wall and the rear wall, respectively, whereby the at least one of the first and the second side walls is detachable against the respective front and rear detachable edges via the pair of fastening elements.

7. The cargo bicycle of claim 6, wherein the canopy further comprises a frame structure at least partially supporting the upper interior space comprising a front spring force arched cross member, a rear spring force arched cross member and a pair of diagonal arched ceiling members, and the front wall, the rear wall and the ceiling element each comprise frame structure receiving inlets near to the front ceiling edge and connection to the first front and the rear wall edges, near to the rear ceiling edge and connection to the second front and the rear wall edges, and diagonally across the ceiling element, respectively, whereby the front spring force arched cross member, the rear spring force arched cross member and the pair of diagonal arched ceiling members are assembled to the front wall, the rear wall and the ceiling element via the frame structure receiving inlets, respectively.

8. The cargo bicycle of claim 6, wherein the canopy wall elements comprise at least one window integrated into the front wall, the rear wall, the first side wall or the second side wall or any combination of the foregoing.

9. The cargo bicycle of claim 8, wherein the at least one window is made of a transparent material, a translucent material or a UV resistant material or any combination of the foregoing.

10. The cargo bicycle of claim 6, wherein the rear wall comprises an upper rear element having an expansive element integrated centrally into a lower side thereof and a pair of adjustable fasteners, each on opposite sides of the expansive element near to a lower edge of the upper rear element and a lower rear element, wherein the upper rear element overlaps the lower rear element, and wherein when the pair of adjustable fasteners are released, the expansive element expands a volume of the upper interior space.

11. The cargo bicycle of claim 1, wherein the box wall elements comprise a first box side element, a second box side element opposite the first box side element, a first box inner side shaping element extending from a first perimeter edge of the first box side element, a second box inner side shaping element extending from a second perimeter edge of the second box side element, a front box element extending from front side edges of the first and the second box side elements and the first and the second box inner side shaping elements, respectively, and a rear box element extending from rear side edges of the first and the second box side elements and the first and the second box inner side shaping elements, respectively, the first box side element, the second box side element, the front box element, and the rear box element at least partially defining the lower interior space and the first box side element, the second box side element, the front box element, the rear box element, the first box inner side shaping element, and the second box inner side shaping element at least partially defining the pair of lower interior side spaces, respectively.

12. The cargo bicycle of claim 11, wherein the first box inner side shaping element has at least a first inner seat shaping element flap extending therefrom, the second box inner side shaping element has at least a second inner seat shaping element flap extending therefrom, the front box element has a front inner seat shaping element extending centrally therefrom, and the rear box element has a rear inner seat shaping element extending centrally therefrom, whereby the front inner seat shaping element is fastenable to the rear inner seat shaping element and the first box inner side shaping element is fastenable to the second box inner side shaping element.

13. The cargo bicycle of claim 11, wherein the box further comprises at least a pair of footboard attachment fasteners disposed near to the first and the second perimeter edges, respectively, and wherein attachment of the box to the pair of footboards is via the at least a pair of footboard attachment fasteners.

14. The cargo bicycle of claim 1, wherein at least one of the canopy or the box or any combination of the foregoing, is made of a waterproof, a showerproof, a moisture wicking, a quick drying, a wind resistant, a dirt resistant, a mildew resistant, an oil resistant, a salt resistant, a chemical resistant or a UV ray resistant material or a coating or any combination of the waterproof, showerproof, the moisture wicking, the quick drying, the wind resistant, the dirt resistant, the mildew resistant, the oil resistant, the salt resistant, the chemical resistant and the UV ray resistant material or the coating.

15. The cargo bicycle of claim 1, further comprising at least one of a passenger bike seat, the passenger bike seat having a back support or a child bike seat or any combination of the foregoing, mounted to at least the rear carrier rack, opposite the rear wheel, supporting passengers when in a seated position on the cargo bicycle.

16. The cargo bicycle of claim 1, wherein the cargo bicycle is at least one of a pedal, pedal-based electric assist or electric cargo bicycle.

* * * * *